Jan. 20, 1970 M. J. BIRCK 3,491,207

SUBSCRIBER'S TWO-WIRE LINE INCLUDING CARRIER TELEPHONE COMMUNICATION SYSTEM

Filed Oct. 7, 1965 9 Sheets-Sheet 1

INVENTOR
MICHAEL J. BIRCK
BY Patrick J. Roche
ATTORNEY

INVENTOR
MICHAEL J. BIRCK
BY Patrick J. Roche
ATTORNEY

INVENTOR
MICHAEL J. BIRCK
BY
Patrick J. Roche
ATTORNEY

110

130

INVENTOR
MICHAEL J. BIRCK
BY
Patrick J. Roche
ATTORNEY

INVENTOR
MICHAEL J. BIRCK
BY
Patrick J. Roche
ATTORNEY

INVENTOR
MICHAEL J. BIRCK
BY
Patrick J. Roche
ATTORNEY

210

130a

INVENTOR
MICHAEL J. BIRCK
BY
Patrick J. Roche
ATTORNEY

INVENTOR
MICHAEL J. BIRCK
BY
Patrick J. Roche
ATTORNEY

Jan. 20, 1970 M. J. BIRCK 3,491,207

SUBSCRIBER'S TWO-WIRE LINE INCLUDING CARRIER TELEPHONE COMMUNICATION SYSTEM

Filed Oct. 7, 1965 9 Sheets-Sheet 9

INVENTOR
MICHAEL J. BIRCK

BY Patrick J. Roche

ATTORNEY

United States Patent Office 3,491,207
Patented Jan. 20, 1970

3,491,207

SUBSCRIBER'S TWO-WIRE LINE INCLUDING CARRIER TELEPHONE COMMUNICATION SYSTEM

Michael J. Birck, Martinsville, N.J., assignor, by mesne assignments, to Superior Continental Corporation, a corporation of Delaware Filed Oct. 7, 1965, Ser. No. 493,862
Int. Cl. H04j *3/02*
U.S. Cl. 179—15 34 Claims

ABSTRACT OF THE DISCLOSURE

A customer's two-wire line providing a two-way voice-frequency channel between a customer's terminal and a central office terminal and including an astable multivibrator modulator and a monostable multivibrator demodulator at each of the terminals in a two-way carrier channel for adding a second customer to the same two-wire line.

This invention relates to a two-way telephone system for transmitting voice-frequency signals on a two-wire transmission line connecting a customer's terminal and a central office terminal, and more specifically to a modification of such system to include a two-way carrier channel for transmitting additional voice-frequency signals on the same two-wire transmission line connecting the customer's and central office terminals.

Heretofore, multi-channel carrier systems have been used with paired cables, open wire lines, microwave radio and coaxial transmission cables. Since all of these systems extend between central office terminals distributed over distances of several hundred miles, or even several thousand miles, it has been necessary to use specially designed repeaters, filters, hybrid coils, and the like, on the cables, depending upon the overall bandwidth of the system. Also, multi-channel telephone systems have been used on 2-wire transmission lines extending between central office terminals spaced over distances of several hundred miles. In present carrier telephone systems, it has been found that the cost of maintenance from monetary and personnel standpoints has been commensurate with the complexities of the respective systems. As a consequence, the use of the prior art carrier telephone systems has been limited to situations which warranted the economics involved.

The present invention contemplates therefore a modification of a 2-wire line connecting one telephone customer in one geographical area to a central office terminal for 2-way voice communication therebetween to include a carrier channel for connecting at least one additional customer in the one geographical area on the same two-wire line to the same central office for 2-way carrier communication therebetween while at the same time maintaining privacy between the two customers.

It is a principal object of the present invention to modify a telephone customer's 2-wire line transmitting only voice-frequency signals to include a carrier frequency channel for transmitting carrier-frequency signals simultaneously with the voice-frequency signals to add at least one additional customer to the some 2-wire line.

It is an additional object to adapt a 2-wire telephone line transmitting only voice-frequency signals to include a carrier frequency channel for transmitting carrier-frequency signals simultaneously with the voice-frequency signals.

It is another object to maintain privacy between two telephone customers talking at the same time on the same 2-wire line.

It is a further object to provide at least one of two customers with carrier telephone equipments to maintain privacy between the two customers as they talk at the same time on the same 2-wire line.

It is still another object to add at least one additional telephone subscriber's channel to a 2-wire line already adapted with a subscriber's voice-frequency facility without impairing the operation of the latter facility.

It is still a further object to provide complementary carrier channels at one of two customers terminals and at a central office terminal, all of which terminals are interconnected by one 2-wire line, to constitute a two-way carrier telephone channel for the one customer while the other customer is provided with voice-signaling channel in order to include the one and other customers on the one 2-wire line.

In connection with a two-wire customer's line interconnecting a first customer's telephone set at a customer's terminal and a main distributing frame at a central office terminal and providing a voice-frequency channel for two-way signaling therebetween, a specific embodiment of the present invention for providing a two-way carrier channel between such two terminals to permit the addition of a second customer's telephone set to the same customer's two-wire line comprises at each of the terminals an astable multivibrator modulator transmitting a carrier signal varying in frequency relative to a preselected frequency in response to the varying magnitude of a modulating signal of varying frequency, and a monostable multivibrator demodulator receiving the transmitted frequency modulated carrier signal for producing modulating signal of output pulses fixed in number in a given time interval in response to positive cycles of the preselected carrier signal frequency and output pulses varying in number relative to the fixed number thereof in the given time interval in response to positive cycles of the varying frequency carrier signal, low-pass filter means for utilizing the varying number of output pulses to produce an alternating current signal varying in magnitude and frequency corresponding with the varying magnitude and frequency of the modulating signal, and frequency-selective means for supplying the corresponding signal as produced to the second subscriber's set and main distributing frame; whereby the two-way carrier channel is provided on the customer's voice-frequency signaling two-wire line for adding the second subscriber's telephone set thereto.

One feature of the present invention involves the use of a transistor emitter follower for controlling the frequency of the output oscillations of a transistor astable multivibrator modulator, comprising a pair of transistors, each including a base, a collector and an emitter, and a pair of R-C timing networks, each including a series resistor and a capacitor, and a source of direct current voltage of preselected polarity. These transistors are connected between ground and a direct current voltage source to constitute an astable multivibrator frequency modulator which alternately turns-on and turns-off the respective transistors under control of the timing R-C networks for providing the output oscillations. The timing R-C networks for the respective modulator transistors are returned to the voltage source via the above-mentioned transistor emitter follower having its emitter connected to a point common to the pair of R-C timing networks, its collector to the voltage source and its base to a source of voice-frequency voltage for frequency modulating the multivibrator output oscillations. As the amount of charging current supplied to the respective timing R-C networks is changed by the emitter follower in response to the frequency variations of the voice-frequency voltages applied to the base thereof, the resultant charging voltages in the respective R-C networks are correspondingly varied whereby the frequency of the output oscillations produced by the multivibrator is similarly varied. Thus, the frequency variations of the voice-frequency voltages applied to the emitter follower base serve to frequency modulate the multivibrator's output oscillations.

Another feature concerns the use of a temperature-responsive transistor amplifier, including a base connected to the source of voice-frequency voltages, a collector connected to the direct current voltage source and to the base of the emitter follower included in the multivibrator as above mentioned, and an emitter connected to ground via a preselected temperature responsive network. This transistor provides amplification for the modulating voice-frequency voltages and at the same time compensates for ambient temperature effects inherent in the multivibrator transistors whereby the average frequency of the multivibrator output oscillations is stabilized.

An additional feature involves a transistor monostable multivibrator for demodulating frequency modulated signals, comprising a pair of transistors, each including a base, a collector and an emitter, an R-C network and a source of direct current voltage of preselected polarity arranged in circuit for providing frequency detection of incoming frequency-modulated carrier voltages. In response to an unmodulated alternating current input voltage, the transistor multivibrator detector produces a train of output pulses at the same frequency as the input voltage with uniform spacing between successive pulses and uniform pulse width. If the input signal is frequency modulated, the spacing between the output pulses is varied in accordance with the increases or decreases in the frequency of the input signal relative to the afore-noted predetermined frequency. Thus, the average or instantaneous direct-current level of the multivibrator detector output varies with the frequency changes in the input voltage. A low-pass filter extracts a voltage representing the slowly varying frequency of the detected output pulses and at the same time suppresses carrier voltages of the predetermined frequency. The slowly varying average voltage of these output pulses represents the initial modulating voltage and is to be recovered. In this way, the initial modulating voltages are recovered.

An additional feature relates to a 3-stage transistor receiving amplifier for amplifying the frequency modulated voltages incoming on the 2-wire line to either the customer's terminal or the central office terminal. Negative feedback is used around the first two stages to stabilize gain, to compensate for variations in its component characteristics, to present correct output impedance to the input of a filter network connecting the second and third stages, and to present the correct input impedance to the output of a preceding filter. The third stage saturates for predetermined magnitudes of input voltages applied thereto, thereby functioning as a voltage limiter. Local feedback in the output stage stabilizes the gain and at the same time provides a correct input impedance for this stage as seen by the output of the preceding filter. The filter network attenuates the locally generated carrier signal of predetermined frequency and prevents it from triggering the above-noted multivibrator detector into false operation.

A further additional feature involves a switching device located at the customer's terminal and controlled by the telephone set thereat for rendering the frequency modulator operative and inoperative at the latter terminal during off-hook and on-hook states, respectively, of the latter set.

Still another feature concerns a voltage commutating apparatus used at the customer's telephone set for providing ringing voltage therefor in response to an alternating current ringing voltage of preselected frequency originating at the central office.

Still another feature relates to the use of a switching device controlled by the telephone set at the customer's terminal for activating the frequency modulator thereat to transmit an unmodulated continuous carrier voltage of preselected frequency and pulses thereof for indicating off-hook and dial-pulsing operations, respectively, of the latter telephone set to the central office terminal.

An additional feature involves a transistor amplifier including a push-pull output stage for amplifying incoming alternating current ringing voltages to activate the ringer of the carrier customer's telephone set.

The invention will be readily understood from the following description when taken together with the accompanying drawings in which.

It is understood that the same reference numerals are used to identify identical components appearing in the several figures of the drawing.

GENERAL CARRIER SYSTEM IN FIG. 1

Figure 1:
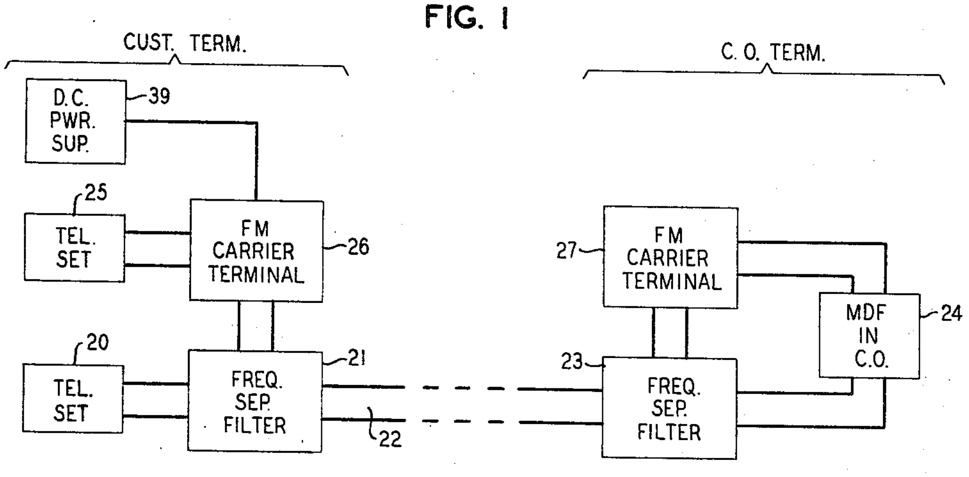
FIG. 1 is a box diagram illustrating a specific embodiment of the present invention.

A general aspect of the invention contemplates the adaptation of a normal voice-frequency telephone facility effective in opposite directions on a two-wire transmission line to include a carrier-frequency telephone facility effective also in opposite directions on the same two-wire line. This is broadly illustrated in FIG. 1 in which a voice-frequency telephone set 20 at a customer's terminal in one geographical area is connected to a first input of frequency separation filter 21 whose output is connected to a two-wire voice-frequency transmission line 22 having one end in the customer's terminal and the opposite end in a central office terminal. The latter end is connected through a frequency separation filter 23 to a main distributing frame 24 included in a telephone central office.

For the purpose of this description it is understood that the telephone set includes all features that are normally used to initiate and receive voice-frequency telephone calls, that the frequency separation filters at both the customer's and central office terminals transmit voice-frequency telephone signals in opposite directions as subsequently pointed out with substantially no attenuation, and that the main distributing frame provides access to the central office which receives incoming telephone calls from other subscribers or routes outgoing telephone calls to other subscribers. It is thus apparent that the voice-frequency telephone facility functions in a well-known manner.

In accordance with the broad aspect of the present invention shown in FIG. 1, a second telephone set 25 located in the customer's terminal in a different geographical area is connected through a first frequency modulated carrier terminal 26 to a second input of filter 21. At the same time, a second telephone line at the central office is connected through a second frequency-modulated carrier terminal 27 to its associated filter 23. A supply 39 of direct current voltage in the customer's terminal provides suitable power for operating the carrier terminal thereat as subsequently pointed out while the power requirements for operating the carrier terminal at the central office are provided by the sources of direct current voltages normally available thereat and mentioned hereinafter.

In the operation of the carrier terminals in FIG. 1, voice-frequency voltages originating as an outgoing call in telephone set 25 of the customer's terminal, for example, serve to frequency modulate a carrier voltage of preselected frequency. The frequency modulated voltages related to the preselected carrier voltage are transmitted via filter 21 to line 22 at the customer's terminal. At the central office terminal, the frequency-modulated carrier voltages received from the line are passed through filter 23 into the frequency-modulation carrier terminal 27 in which the latter voltages are demodulated to voice-frequency voltages corresponding with those originating in telephone set 25 in the customer's terminal.

In a similar manner, voice-frequency signaling voltages incoming to the main distributing frame as an incoming call are supplied to carrier terminal 27 in the central office to frequency modulate thereat a carrier voltage having a preselected frequency different from the preselected frequency of the carrier voltage originating at customer's carrier terminal 26. The incoming voice-frequency voltages frequency modulate the different carrier voltage. The different carrier frequency modulated voltages are passed by filter 23 to line 22 for transmission thereon to the customer's terminal 26. At this terminal the different carrier frequency modulated voltages received from line 22 are passed through filter 21 into carrier terminal 26 in which the latter voltages are demodulated to voice-frequency voltages corresponding with those incoming as the incoming call to the main distributing frame at the central office. These demodulated voice-frequency voltages are supplied to telephone set 25 in the customer's terminal for utilization thereby as an incoming call. Further details regarding the carrier terminals and filters, as well as those concerning on-hook, off-hook, dial pulsing, ringing and voice-frequency modulation are given hereinafter.

CARRIER SYSTEM COMPONENTS

Figure 4:
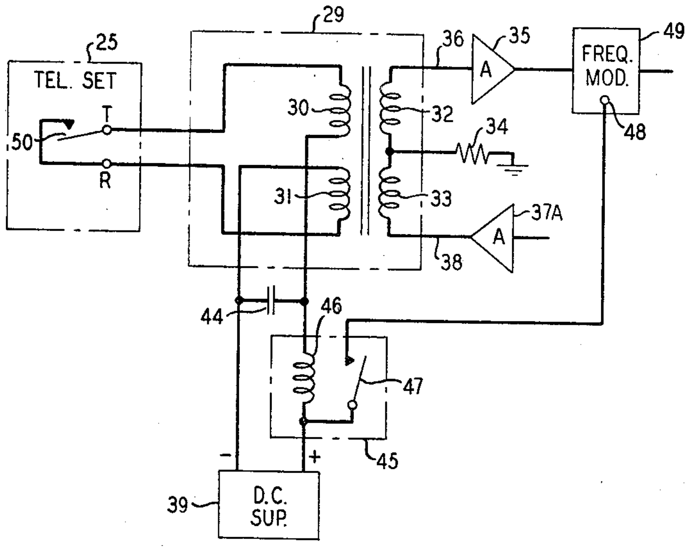
FIG. 4 is a schematic circuit of a voice-frequency hybrid coil usable in FIG. 2.
Figure 2:
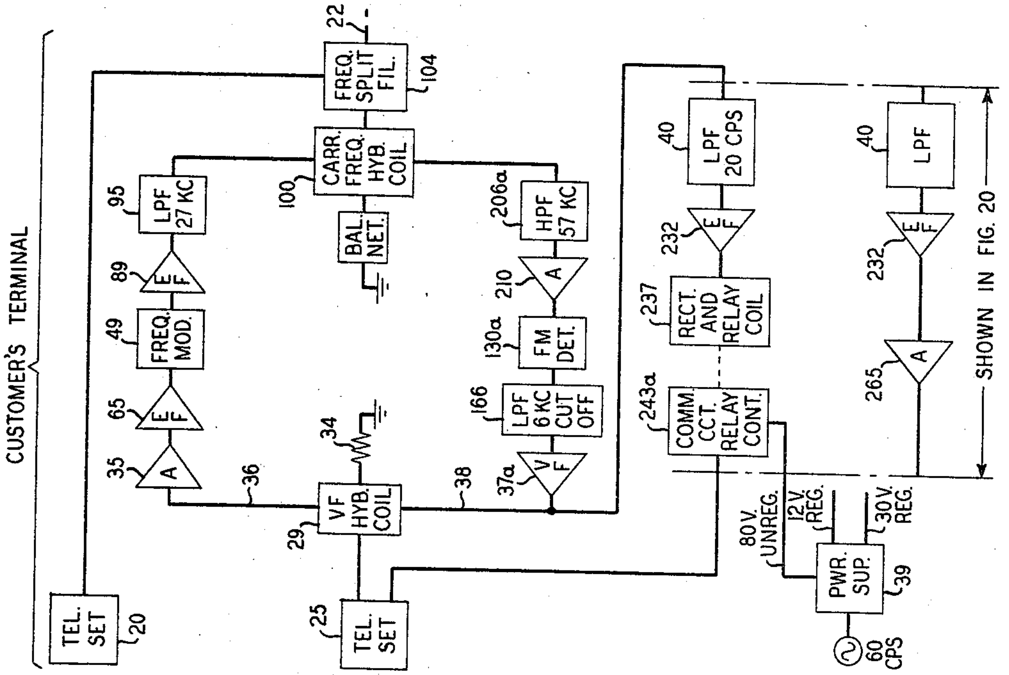

Voice frequency hybrid coil and dial pulsing in customer's terminal, FIGS. 2 and 4

Voice-frequency hybrid coil 29 in FIG. 4 comprises two windings 30 and 31 having one end connected to tip and ring terminals T and R, respectively, of telephone set 25 whose structure is well known in the art. In this connection, it is understood that the operation of the telephone set provides on-hook, off-hook, dial pulsing, ringing, and voice-frequency voltage states, all of which are utilized for a purpose and in a manner described below. The coil also includes two windings 32 and 33 having a midpoint connected through resistor 34 to ground. The opposite end of secondary winding 32 is joined to the input of a voice-frequency amplifier 35 connected in a transmitting path 36 while the opposite end of secondary winding 33 is connected to the output of a voice-frequency amplifier **37*a* included in a receiving path 38 in the customer's terminal. A supply 39 of direct current voltage has a positive terminal connected to the opposite end of winding 30 and its negative terminal to the opposite end of winding 31**.

An electromagnetic relay 45 comprises an operating winding 46 connected between the positive terminal of supply 39 and the opposite end of winding 30, and a movable contact 47 having one end fixedly connected to the positive terminal of supply 39 and an opposite end detachably connectable to a preselected contact 48 included in frequency modulator 49 for a purpose that is presently described. The structure and operation of the frequency modulator are subsequently described in detail in regard to FIGS. 2 and 5. A capacitor 44 connected across the opposite ends of windings 30 and 31 completes the voice-frequency circuit at the customer's terminal.

In the operation of FIG. 4, switch 50 shown therein in an open condition in telephone set 25 indicates an on-hook state thereof which involves an open series circuit including the positive terminal of supply 39, relay winding 46, hybrid winding 30, open switch 50, hybrid winding 31, and negative terminal of supply 39. This open circuit deenergizes relay winding 46 to open its contact 47 whereby positive voltage is removed from preselected contact 48 to render frequency modulator 49 inoperative. This is recognized as an on-hook condition of the telephone set by the central office terminal.

In an initially closed condition of switch 50 to indicate an off-hook state in telephone set 25 in the customer's terminal, the previously traced series circuit is closed to energize relay winding 46 which thereupon closes its contact 47 to supply positive direct current voltage from supply 39 to the preselected contact 48 of frequency modulator 49. This renders the frequency modulator operative to continuously transmit the preselected carrier voltage having a 20 kc. frequency, for example, in unmodulated form to line 22 and thereby to the carrier terminal 27 in the central office in a manner and for a purpose that are subsequently explained. This 20 kc. voltage received in the central office terminal is recognized thereby as an off-hook state of the telephone set 25 at the customer's terminal.

A dial pulsing state of switch 50 in telephone set 25, which is still in the off-hook state, at the customer's terminal serves to alternately close and open this switch at the dial pulsing rate whereby the previously traced series circuit including relay winding 46 is alternately closed and opened. This serves alternately to close and open relay contact 47 which thereby alternately connects and disconnects the positive voltage terminal of supply 39 to and from, respectively, preselected contact 48 in frequency modulator 49. This renders the frequency modulator alternately operative and inoperative for transmitting pulses of the preselected 20-kc. carrier voltage in unmodulated form to the 2-wire line and thereby to the carrier terminal in the central office in correspondence with dial pulsing actuations of the telephone set 25.

These unmodulated 20-kc. carrier voltage pulses received by the central office in a different form that is later explained are recognized thereby as a dial pulsing state of telephone set 25 at the customer's terminal. The central office processes the received dialing voltage pulses to route the outgoing call to its ultimate destination in accordance with a routine familiar to the telephone art. Once the customer at telephone set 25 and the customer at the ultimate destination of the outgoing call are interconnected for the transmission of voice-frequency voltages therebetween, the transmission of voice-frequency voltages takes place in opposite directions through voice hybrid coil 29 in FIG. 4, as hereinafter explained with regard to the opreation of FIGS. 2, 3 and 4.

Figure 5:
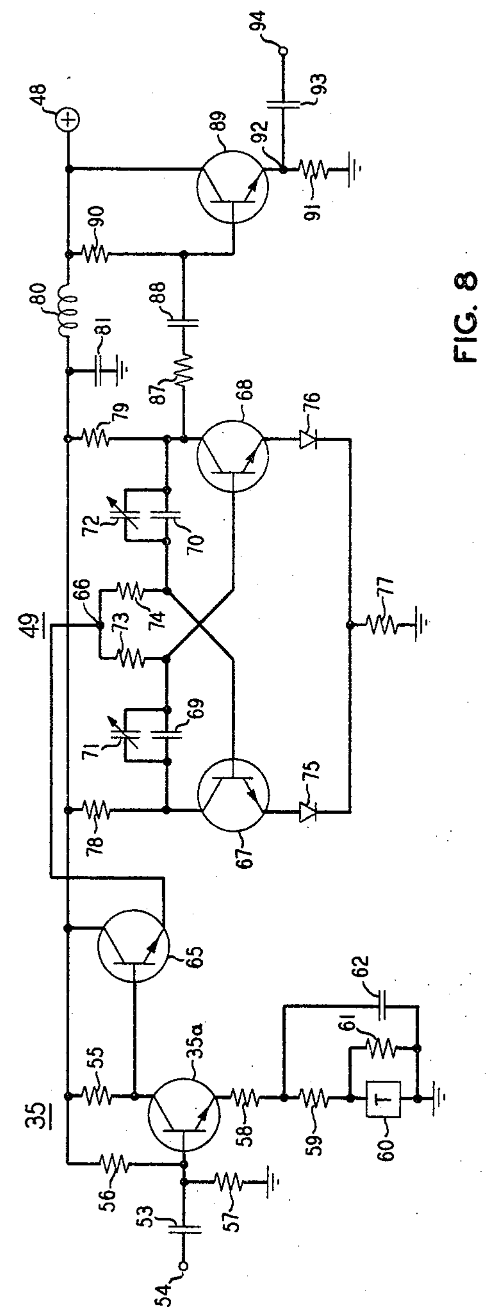
FIG. 5 is a schematic circuit of an amplifier and carrier frequency modulator usable in FIGS. 2 and 3.

Voice frequency amplifier, first emitter follower, frequency modulator and second emitter follower in customer's terminal, FIGS. 2, 4 and 5

The frequency modulator circuit shown in FIG. 5 comprises a voice-frequency amplifier 35 including a transistor 35a having a base connected via capacitor 53 and terminal 54 to one end of hybrid winding 32 in FIG. 4. The collector of this transistor is connected through resistor 55 to preselected contact 48 which is connectable to and disconnectable from the positive terminal of voltage supply 39 in the manner and for the purpose hereinbefore mentioned in regard to the circuit of FIG. 4 and further mentioned hereinafter. A voltage divider comprising series resistors 56 and 57 has one end joined to preselected contact 48 and an opposite end to ground, and has a point of predetermined voltage magnitude connected to the base of transistor 35a. This point supplies such magnitude of biasing voltage to the transistor base as to bias the transistor into the active region.

The emitter of input transistor 35a is connected through a series circuit including resistors 58 and 59 and thermistor 60 to ground. A resistor 61 is connected in shunt with the thermistor while a capacitor 62 is connected in shunt of series-parallel resistor 59 and thermistor 60. This overall series circuit operates to provide ambient temperature compensation in such sense that the output voltage at the transistor collector is caused to increase in magnitude for a decreasing ambient temperature and to decrease in magnitude for an increasing ambient temperature as mentioned below. This compensates for relatively large ambient temperature changes for a purpose that is subsequently specified.

Input transistor 35a also has its output collector connected directly to the base of a second transistor 65 having its collector connected to preselected contact 48 and its emitter to a point 66. Direct current bias for the base of transistor 65 is obtained from the collector circuit of input transistor 35a. Transistor 65 connected as an emitter follower functions in a manner that is later mentioned. The above-noted thermistor network serves to increase the biasing voltage on the base of transistor 65 at low ambient temperature and to decrease it for high ambient temperatures thereby compensating for temperature effects in the multivibrator transistors 67 and 68 as mentioned below.

A frequency modulator 49 comprises third and fourth transistors 67 and 68, respectively, each having a base, a collector and an emitter. A fixed capacitor 69 connects the collector of transistor 67 to the base of transistor 68 while a fixed capacitor 70 connects the collector of transistors 68 to the base of transistor 67. A trimmer capacitor 71 shunts capacitor 69 and a trimmer capacitor 72 shunts capacitor 70. A resistor 73 has one end joined to a point common to capacitor 69 and the base of transistor 68 and a resistor 74 has one end connected to a point common to capacitor 70 and the base of transistor 67, while corresponding opposite ends of resistors 73 and 74 are connected to the common point 66. The emitters of transistors 67 and 68 are connected through individual diodes 75 and 76, respectively, and a common resistor 77 to ground, both latter diodes being poled in a direction away from the emitters and toward ground. These diodes preclude breakdown of the emitter-base junctions of the respective transistors at cut-off in the respects mentioned below. Resistors 78 and 79 join the collectors of transistors 67 and 68, respectively, to preselected contact 48. An impedance network including an inductor 80 connected in series with preselected contact 48 and resistor 79 and a capacitor 81 connected to a point common to resistor 79 and inductor 80 serves to decouple the modulator circuit power supply from the power leads to other circuits. Transistors 67 and 68 are thus connected in circuit as an astable multivibrator for a purpose that is later mentioned.

The output of the astable multivibrator appearing at the collector of transistor 68 is applied via a series R-C network including a resistor 87 and a capacitor 88 to the base of transistor 89. This base is also connected to resistor 90 having one end common to the latter base and capacitor 88 and an opposite end to preselected contact 48. Transistor 89 also has its collector connected directly to preselected contact 48 and its emitter through resistor 91 to ground. Transistor 89 is thus connected as an emitter follower. A point 92 common to the emitter of transistor 89 and resistor 91 is connected via capacitor 93 to output terminal 94 which is joined to the input of a low-pass filter 95 included in the transmitting path 36 at the customer's terminal as shown in FIG. 2.

The operation of the carrier voltage modulating or generating circuit shown in FIG. 5 takes place in the following manner. Assuming that a positive voltage is being supplied to preselected contact 48 in FIGS. 4 and 5, the astable multivibrator constituted by the above-described circuitry including transistors 67 and 68 functions to provide square-wave oscillations at the collector of transistor 68. The frequency of these oscillations is determined by the charging time of capacitors 69 and 70 through the respective resistors 73 and 74. If, as it is well-known, the voltage at common terminal 66 were fixed at a constant magnitude, then a charging voltage of constant value would be applied to the time-constant charging networks comprising resistor 73 and capacitor 69 and resistor 74 and capacitor 70, respectively.

As a consequence, voltages of constant magnitude would be alternately applied to the bases of the respective transistors 67 and 68 whereby the frequency of the output oscillators at the collector of transistor 68 would be fixed approximately at a constant value. Depending on the preselection of the parameters of the charging networks including capacitor 69 and resistor 73 and capacitor 70 and resistor 74, respectively, the frequency of the output oscillations can be given a preselected numerical value. This can be adjusted to a precisely preselected value by appropriate adjustments of the respective trimmer capacitors 71 and 72. This assumes, for the moment, that a constant amount of current is supplied via the emitter follower 65 to the respective charging networks as above identified. For the purpose of this explanation, the preselected frequency of such output oscillations provided at the collector of transistor 68 is assumed to be 20 kilocycles.

As the base of emitter follower 65 is connected to the output of voice-frequency amplifier 35, then the varying magnitudes of voice-frequency alternating current voltages amplified therein are applied to the base of emitter follower 65. These voltages serve to vary the amount of current flowing in emitter follower 65 and thereby the amount of current flowing in the respective charging networks as above identified at a given instant. This controls conduction and non-conduction of transistors 67 and 68 thereby varying the frequency of the output oscillations of the astable multivibrator modulator relative to the preselected 20-kc. frequency. Because the frequency of the output oscillations at the collector of transistor 68 is dependent upon the magnitude of the voltages effective at the respective bases of the multivibrator transistors 67 and 68 at a given time, it is apparent that variations in the magnitude of such voltages cause corresponding changes in the frequency of the output oscillations of the multivibrator modulator.

Thus, the voice-frequency alternating current voltages originating in the telephone set 25 in the customer's terminal serve to frequency modulate the output of the multivibrator modulator 49 in FIGS. 2 and 5 relative to the preselected 20-kilocycle frequency for a purpose that is later mentioned. For the instant description, it was assumed as above indicated that multivibrator frequency-modulator 49 in FIGS. 2 and 5 provided a carrier voltage of the preselected frequency of 20 kilocycles for use in the transmitting path 36 in the one direction from the customer's terminal to the central office terminal. This assumes further that no voice-frequency voltages are being supplied to the base of emitter follower 65 in FIG. 5 whereby a constant amount of charging current is being supplied via emitter follower 65 to the timing capacitors 69 and 70. It is noted here that temperature effects inherent in multivibrator transistors 67 and 68 are compensated for by temperature compensated amplifier 35 whereby the multivibrator oscillations are stabilized.

Figure 6:
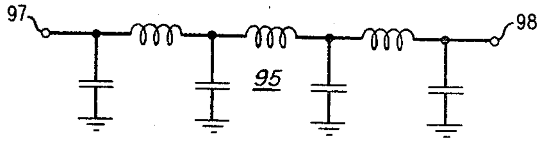
FIG. 6 is a schematic circuit of a low-pass filter usable in FIGS 2 and 3.

A low-pass filter 95 in FIGS. 2 and 6 has its input terminal 97 connected to output terminal 94 of the multivibrator frequency-modulator 49, includes an output terminal 98, and is provided with a pass-band with a cut-off at 27 kilocycles. This filter is also used in the central office terminal in FIG. 3 as mentioned hereinafter.

Figure 7:
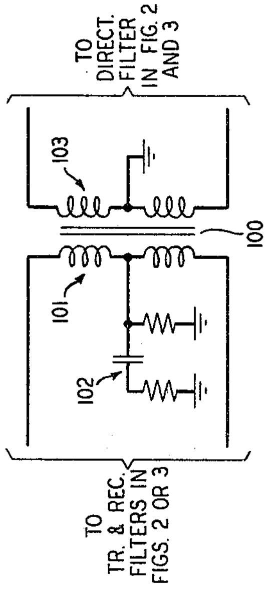
FIG. 7 is a schematic circuit of a carrier-frequency hybrid coil usable in FIGS. 2 and 3.

A carrier hybrid coil 100 in FIG. 7 comprises a split winding 101 having a midpoint connected via resistive-capacitive network 102 to ground and a split winding 103 having a midpoint connected directly to ground. This hybrid coil has an effective frequency range from 10 through 70 kilocycles. It is used in the customer's terminal in FIG. 2 and in the central office terminal in FIG. 3. This coil is connected to the respective filters 95 and 104 as shown in FIGS. 2 and 3.

Figure 3:
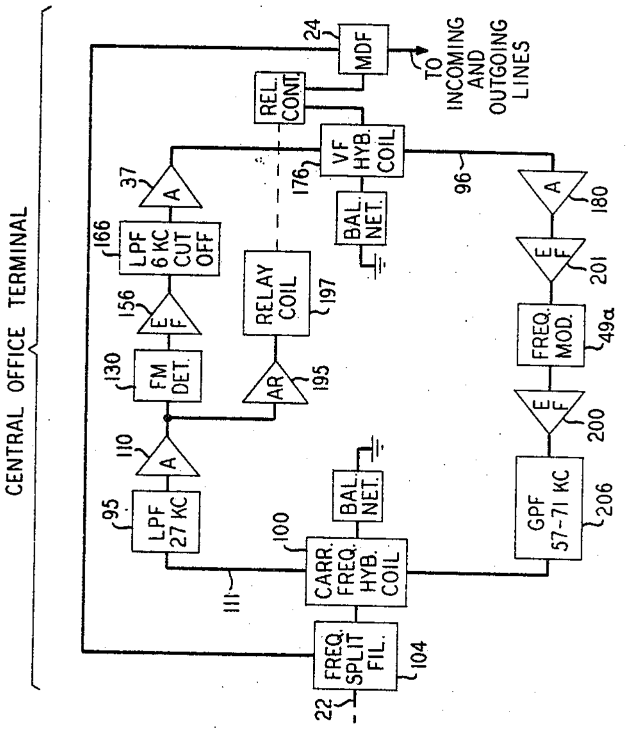
FIGS. 2 and 3 are box diagrams showing the specific embodiment of the present invention in more detailed form over FIG. 1.
Figure 8:
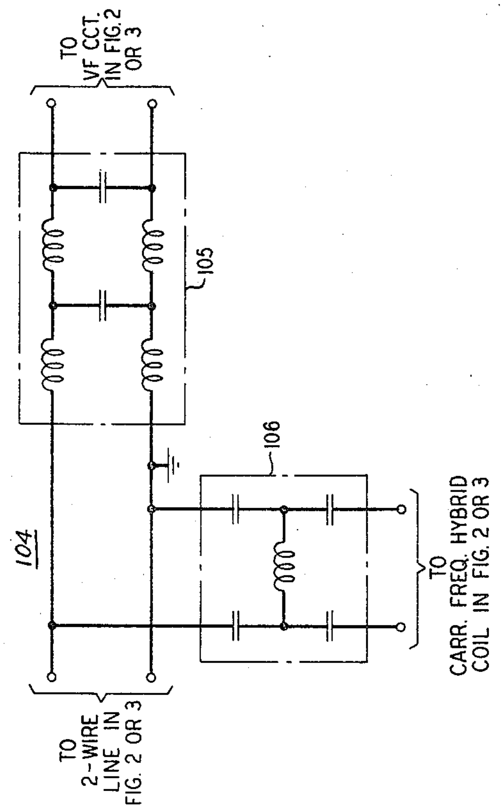
FIG. 8 is a schematic circuit of a directional filter usable in FIGS. 2 and 3.

FIG. 8 shows a frequency separation filter 104 used in the customer's terminal in FIG. 2 and in the central office terminal in FIG. 3 for connecting voice-frequency equipment and carrier-frequency hybrid coils to the 2-wire transmission line. This filter includes a low-pass section 105 for passing voice-frequency voltages to and from the line and a high-pass section 106 for passing carrier voltages to and from the line, both sections being balanced to ground and providing substantially no attenuation for the respective voice and carrier voltages.

Figure 9:
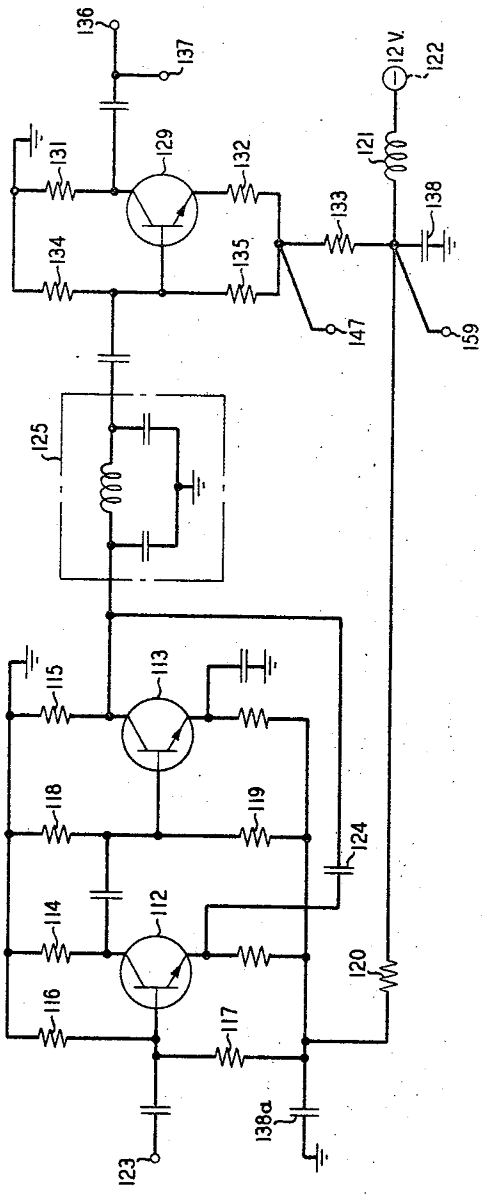
FIG. 9 is a schematic circuit of a carrier voltage amplifier usable in FIG. 3.

Receiving carrier amplifier in central office terminal, FIGS. 3 and 9

Figure 16:
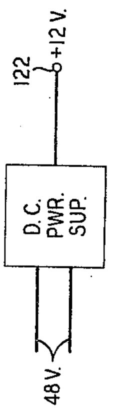
FIG. 16 is a box diagram of a direct current voltage supply usable in FIG. 9.

FIG. 9 shows an amplifier 110 for amplifying carrier-frequency voltages received in receiving path 111 in FIG. 3 at the central office terminal to compensate for signaling losses occurring in the two carrier frequency hybrid coils 100 and the two-wire transmission line 22 in FIGS. 2 and 3. This amplifier comprises transistor stages 112 and 113. Resistors 114 and 115 connect the collectors of stages 112 and 113, respectively, to ground. Voltage divider resistors 116 and 117 and 118 and 119 have first corresponding opposite terminals connected to ground and second corresponding opposite terminals connected via series resistor 120 and inductor 121 to a terminal 122 of negative polarity of a regulated supply of direct current voltage shown in FIG. 16. A midpoint of voltage divider resistor pair 116 and 117 is directly connected to the base of first stage 112 and capacitively coupled to input terminal 123 which is connected to output terminal 98 of a low-pass filter 95 in FIGS. 2, 3 and 6; and a midpoint of voltage divider resistor pair 118 and 119 is connected to the base of second stage 113. The voltages of the latter two voltage dividers provide the bases of the respective amplifier stages with predetermined amounts of bias.

A negative feedback circuit connecting the collector of second stage 113 to the emitter of first stage 112 and including capacitor 124 stabilizes gain, compensates for variations in the characteristics of the respective amplifier components, and presents optimum impedance to the input of an interstage coupling filter 125. This filter comprises a series inductor and two capacitors, each having one terminal connected to one end of the inductor and an opposite terminal to ground. It precludes locally generated carrier voltages of a 64-kilocycle frequency from erroneously triggering the operation of a following frequency demodulator 130 in FIGS. 3 and 10 in a manner which is presently explained. The output of the filter is coupled to the base of a transistor 129 constituting an output stage of amplifier 110 in FIG. 9. This transistor has its collector joined via resistor 131 to ground and its emitter through series resistors 132 and 133 and inductor 121 to the negative voltage terminal 122. Unbypassed resistor 132 supplies local feedback for transistor 129 as later mentioned and thereby a high input impedance therefor.

Voltage divider resistors 134 and 135 are serially connected between ground and one end of resistor 133 which has its opposite end joined to the negative voltage terminal 122. A midpoint of voltage divider resistors 134 and 135 is connected to the base of the output stage transistor 129 for applying a predetermined magnitude of biasing voltage thereto. In most instances of operation, transistor stage 129 is saturated or cut-off by the peaks of carrier voltage to function as a voltage limiter. The output of the voltage limiter 129 is available at terminals 136 and 137 for purposes that are later explained. Local negative feedback in the voltage limiter 129 is provided via series resistors 132 and 135 from its emitter to its base. Direct current decoupling is provided by capacitors 138 and 138a and resistor 120 connected to the negative terminal 122 through choke 121.

Frequency modulation detector, filters, VF amplifier, hybrid coil and emitter follower in central office terminal, FIGS. 3, 10, 11 and 12

Figure 10:
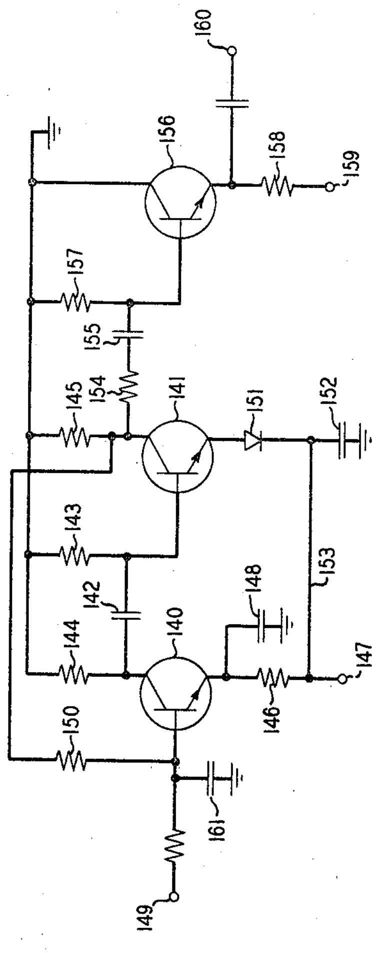
FIG. 10 is a schematic circuit of a frequency modulation detector usable in FIG. 3.
Figure 18:
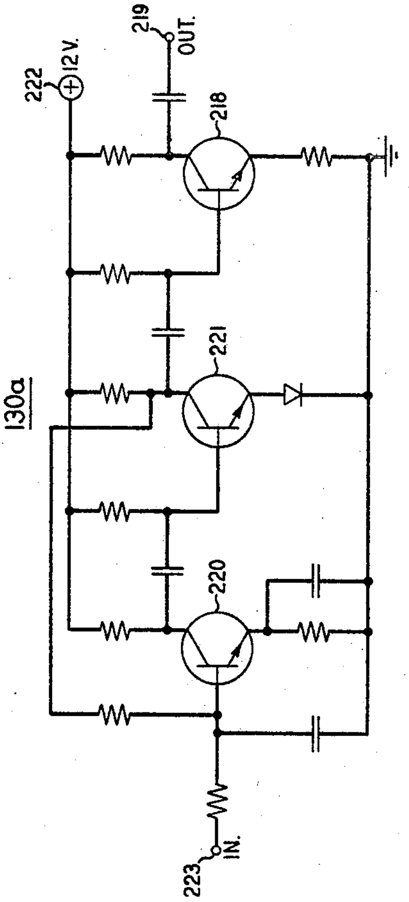
FIG. 18 is a schematic circuit of a frequency modulation detector usable in FIG. 2.

A frequency modulation detector 130 in FIG. 10 is usable at the central office terminal in FIG. 3 to function with a frequency modulated 20-kc. carrier voltage. A modification of this detector identified as frequency modulation detector 130a in FIG. 18 is employed at the customer's terminal in FIG. 2 to function with a frequency modulated 64-kc. carrier voltage. Referring for the moment to FM detector 130 in the central office terminal in FIG. 3, this detector comprises a monostable multivibrator including transistors 140 and 141, each having a base, a collector and an emitter, a capacitor 142 connecting the collector of transistor 140 to the base of the transistor 141, a resistor 143 having one end joined to a point common to capacitor 142 and base of transistor 141 and an opposite end to ground, resistors 144 and 145 connecting the collectors of transistors 140 and 141, respectively, to ground, a resistor 146 connecting the emitter of transistor 140 to a terminal 147 in the receiving amplifier 110 in FIGS. 3 and 9 and a capacitor 148 connecting the emitter of transistor 140 to ground. An input terminal 149 is connected to output terminal 136 of receiving amplifier 110 in FIGS. 3 and 9.

A positive feedback circuit including resistor 150 connects the collector of transistor 141 to the base of transistor 140. A diode 151 joins the emitter of transistor 141 via capacitor 152 to ground, and is poled in a direction away from the emitter. A lead 153 connects emitter resistor 146 of transistor 140 via capacitor 152 to ground. An RC coupling circuit including series resistor 154 and capacitor 155 applies the detector output at the collector of transistor 141 to the base of an emitter follower 156, the latter base being also joined via resistor 157 to ground. This emitter follower has its collector connected to ground, its emitter via resistor 158 to voltage terminal 159 in receiving amplifier 110 in FIGS. 3 and 9, and its output available at terminal 160.

In the operation of the monostable multivibrator frequency-modulation detector 130 in FIGS. 3 and 10, its parameters are so preselected that the transistor 140 is normally biased to an off-state and transistor 141 is normally biased to an on-state. Now a positive cycle of the amplified frequency modulated 20-kilocycle carrier voltage available at the output terminal 136 of receiving amplifier 110 in FIGS. 3 and 9, is applied via terminal 149 to the base of transistor 140 in FIG. 10. When this input voltage exceeds the base-emitter turn-on voltage of transistor 140, this transistor is turned-on and transistor 141 is turned-off for a time interval depending on the preselected time constant of timing capacitor 142 and resistor 143. A bypass capacitor 161 precludes spurious voltages from actuating the detector. When transistor 141 is turned-off a voltage is produced at the collector thereof and applied via series resistor 154 and capacitor 155 to the base of emitter follower 156. During the time transistor 141 is turned-off, transistor 140 is held on by the positive bias obtained through resistor 150. When transistor 141 turns-on again, the base of transistor 140 is grounded through resistor 150 and transistor 140 is turned-off. This terminates the voltage production at the collector of transistor 141 and completes the production of a positive voltage pulse thereat.

The parameters of the multivibrator detector 130 are so preselected that the detector is triggered once for each positive cycle of the preselected 20-kilocycle carrier voltage and frequency modulated voltages related thereto to produce one positive voltage pulse at the collector output of transistor 141. For the purpose of this illustration, each positive pulse produced by the multivibrator detector at the output collector of transistor 141 has a time duration of approximately 6 microseconds. Thus, an unmodulated 20-kilocycle carrier voltage applied to the input of the multivibrator detector 130 in FIGS. 3 and 10 actuates the latter to supply one positive 6-microsecond pulse to the emitter follower 156 for each positive cycle of such carrier voltage, whereby a series of positive pulses having identical time spaces therebetween is produced in the multivibrator detector and supplied to the emitter follower 156 for a given time interval. Diode 151 in the emitter circuit of transistor 141 prevents breakdown of the emitter-base junction thereof at the turn-off of the latter transistor.

When the frequency of the modulated carrier voltage increases above 20 kilocycles more positive pulses are produced by the multivibrator detector in the aforenoted given time interval. When the frequency of the modulated carrier voltage decreases below 20 kilocycles, fewer pulses are produced in the above-mentioned given time interval. It is also apparent that the time spacings between the detected voltage pulses vary with the frequency variations of the 20-kilocycle carrier voltage. It is therefore evident that the average or instantaneous direct current voltage magnitude in the output of multivibrator detector 130 in a given time interval varies with the frequency variations of the preselected 20-kilocycle carrier voltage supplied thereto.

Thus, as the frequency of the input voltage increases, a corresponding increase in the number of output pulses is produced, and vice versa. The output pulses produced by the multivibrator detector 130 and available at output terminal 160 of emitter follower 156 are supplied to input terminal 165 of a 6-kilocycle low-pass filter 166 in FIG. 11. The emitter follower provides impedance transformation between the detector and filter. The slowly-varying frequency and amplitude variations of the output pulses relative to the series of identically time spaced pulses represent the frequency and amplitude variations of the voice-frequency voltages utilized to effect the frequency modulation in frequency modulator 49 in FIGS. 2 and 5 as above explained. The 6-kilocycle filter averages the positive pulses received from the frequency detector output thereby deriving the desired voice-frequency voltage from the frequency-modulated pulses and at the same time suppresses the 20-kc. carrier voltage. In this instance the magnitude of the recovered alternating current signal at a given instant is proportional to the frequency deviation of frequency modulated carrier voltage at that instant. It was found that the operation of the frequency detector was linear over a relatively wide range of frequency deviation voltages, at least for deviations up to plus or minus 7 kc. centered at 20 kilocycles.

Figure 11:
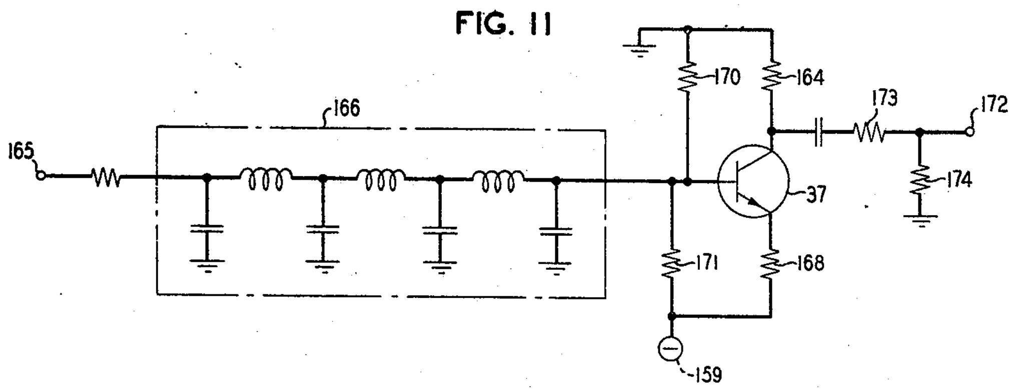
FIG. 11 is a schematic circuit of a filter and amplifier usable in FIGS. 2, 3 and 4.

The voice-frequency voltage recovered in filter 166 and equivalent to those initiated at telephone set 25 in FIG. 2 is amplified in a single stage voice-frequency transistor amplifier 37 in FIG. 11 which has its collector connected via resistor 164 to ground and its emitter via resistor 168 to negative voltage terminal 159 in a receiving amplifier 110 in FIGS. 3 and 9. A voltage divider includes series resistors 170 and 171 connected between ground and the negative voltage terminal 159 and having a common point connected to the base of amplifier 37, whereby a bias of predetermined magnitude is applied thereto. The recovered and amplified voice-frequency voltage is made available at output terminal 172 which is common to forming a voltage divider resistors 173 and 174.

Figure 12:
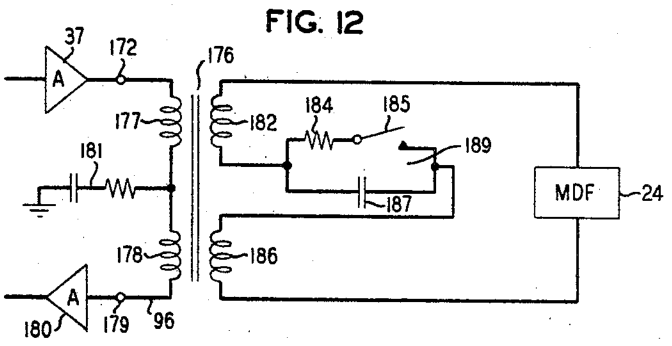
FIG. 12 is a schematic circuit of a voice-frequency hybrid coil and signaling arrangement usable in FIG. 3.

FIG. 12 shows a voice-frequency hybrid coil 176 used in the central office terminal as illustrated in FIG. 3. Output terminal 172 of incoming voice-frequency amplifier 37 in FIG. 11 is connected to one end of winding 177 connected in series with winding 178 which has its opposite end jointed to the input terminal 179 of outgoing amplifier 180 included in a signaling transmission path 96 and constituting a component of a frequency modulator 49*a* discussed hereinafter regarding FIG. 14. An impedance network 181 comprising a capacitor and resistor in series connects a common point of windings 177 and 178 to ground. Winding 182 has one end joined to the main distributing frame 24 and its opposite end to one terminal of a network 189 including a capacitor 187 connected in shunt of a series resistor 184 and relay contact 185 which is subsequently mentioned in regard to the pulse dialing recognition circuit of FIG. 13. The opposite end of network 189 is connected to one end of winding 186 which has its other end connected to the main distributing frame. It is understood that the central office performs functions of routing outgoing and incoming calls in a manner well-known in the art, as hereinbefore mentioned. For the purpose of simplifying this illustration it is assumed that the main distributing frame constitutes essentially a telephone set which has states effective for the production of ringing and voice-frequency voltages. In other words, the main distributing frame performs essentially all of the telephone operations necessary for initiating and carrying on a telephone conversation in a carrier-frequency channel in the direction from the central office terminal to the customer's terminal on the customer's 2-wire signaling transmission line, in the manner subsequently explained.

Figure 13:
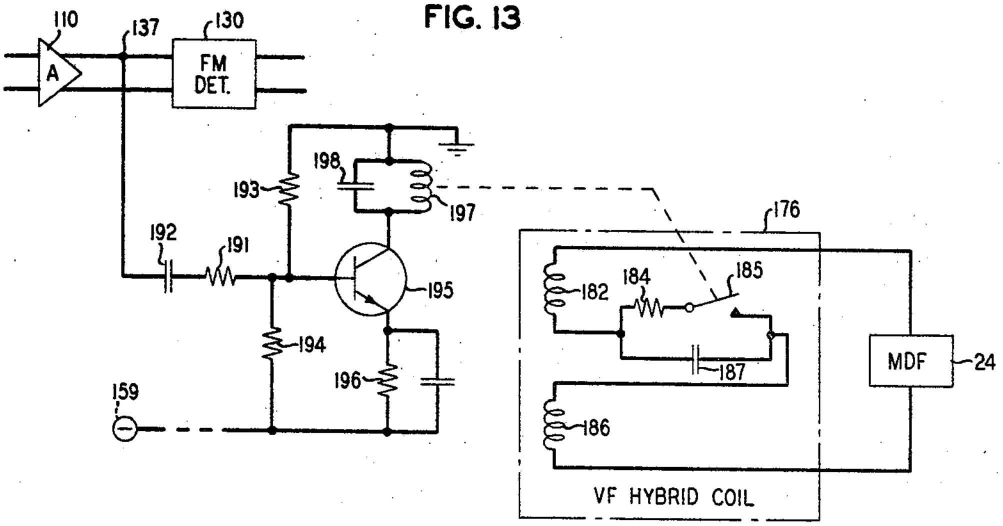
FIG. 13 is a schematic circuit of a dial pulsing recognition circuit usable in FIG. 3.

Off-hook and dial pulsing recognition at central office terminal, FIGS. 3 and 13

Terminal 137 in the output of receiving carrier frequency amplifier 110 in FIGS. 9 and 13 is connected via a coupling network including resistor 191 and capacitor 192 in series for deriving the preselected carrier frequency voltage of 20 kilocycles from the output of the receiving carrier amplifier in the transmission path 111 in the central office terminal. A voltage divider comprising series resistors 193 and 194 is connected between ground and a source of direct current voltage of negative polarity represented by terminal 159 in FIG. 9. A common point of resistor 191 are connected to the base of the transistor 195 having a collector connected to ground through relay control winding 197 and capacitor 198 in parallel and an emitter via resistor 196 to the negative voltage source 159. The common point on the voltage divider applies a predetermined magnitude of biasing voltage to the base of the transistor which is biased almost to cut-off whereby the transistor functions both as a rectifier and amplifier. The capacitor 198 smooths the rectified current supplied to the relay operating winding 197 in the manner later mentioned.

A relay contact 185 associated with the relay operating winding as shown in FIGS. 12 and 13 is normally open and connected in series with resistor 184 which provides the proper DC termination at the main distributing frame 24. A capacitor 187 connected in parallel with the series relay contact and resistor joins the adjacent ends of hybrid coil windings 182 and 186 as shown in FIG. 12 for transmitting voice-frequency voltages through the hybrid coil 176 in FIGS. 3, 12 and 13 to the main distributing frame in a manner later described. When the 20-kc. carrier voltage is derived from the receiving amplifier output terminal 137 via the resistive-capacitive network 191 and 192, a sufficient amount of rectified current energizes the relay operating winding which thereupon closes its associated contact 185. This completes a direct current circuit through hybrid coil 176 for indicating to the main distributing frame at the central office that telephone set 25 at the customer's terminal is in the off-hook state for the purpose of initiating an outgoing call and to anticipate a dial-pulsing operation from the latter set in a manner later explained.

Figure 14:
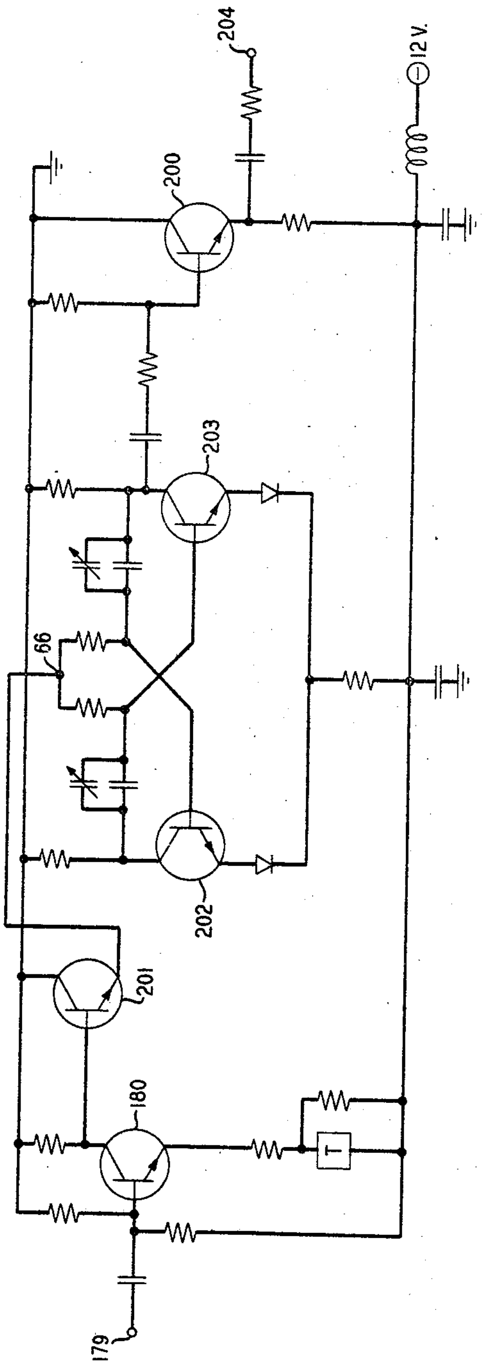
FIG. 14 is a schematic circuit of a carrier-frequency modulator usable in FIG. 3.
Figure 15:
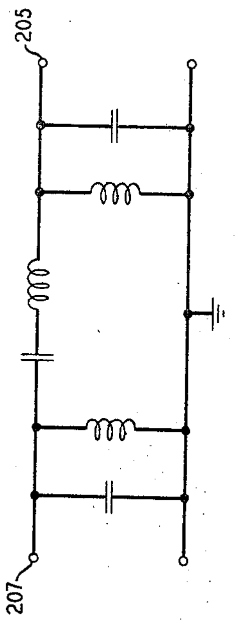
FIG. 15 is a schematic circuit of a carrier-frequency filter usable in FIGS. 2 and 3.

Voice frequency amplifier, carrier frequency modulator, emitter follower and carrier filter at central office terminal, FIGS. 3, 14 and 15

Voice-frequency amplifier 180, emitter follower 201, frequency modulator 49*a* and emitter follower 200 in transmitting path 96 at the central office terminal in FIG. 14 are substantially identical with voice-frequency amplifier 35, frequency modulator 49 and emitter follower 89, respectively, shown in the transmitting path 36 at the customer's terminal in FIGS. 2 and 5. Also, emitter follower 201 in FIGS. 3 and 14 is essentially identical with emitter follower 65 in FIGS. 2 and 5; and an astable multivibrator comprising transistors 202 and 203 in FIG. 14 is essentially identical with the astable multivibrator including transistors 67 and 68 in FIG. 5. Input terminal 179 of transmitting temperature compensated voice-frequency amplifier 180 in FIG. 14 is connected to winding 178 of hybrid coil 176 as shown in FIG. 12; output terminal 204 of emitter follower 200 in FIG. 14 is connected to input terminal 205 of a carrier-frequency filter 206 in FIG. 15 whose output terminal 207 is joined to an appropriate terminal of hybrid coil 100 connected to the transmitting and receiving signaling paths 96 and 111 in the central office terminal as shown in FIGS. 3, 7 and 15.

The operation of frequency modulator 49*a* in FIGS. 3 and 14 is identical with that of frequency modulator 49 in FIGS. 2 and 5, except the parameters of frequency modulator 49*a* are so preselected that it provides an initial carrier voltage of a preselected frequency of 64 kilocycles, for example, and the modulating voice-frequency and ringing voltages operating the latter modulator are supplied by the central office in FIG. 3. As a consequence, modulator 49*a* provides frequency variations approximately in the range of 57 to 71 kilocycles. The frequency of the ringing voltage, as one example, is 20 cycle per second. It is noted that frequency modulator 49*a* in FIGS. 3 and 14 does not include a terminal equivalent to preselected terminal 48 in modulator 49 in FIG. 5 and is therefore in continuous operation, and that temperature-compensated amplifier 180 stabilizes the modulator oscillations in the manner mentioned above for frequency-modulator 49 in FIG. 5.

Carrier hybrid coil and filter, carrier receive amplifier, frequency modulation detector, low-pass filter and voice frequency amplifier in customer's terminal FIGS. 2, 4, 11, 15, 17 and 18

Figure 17:
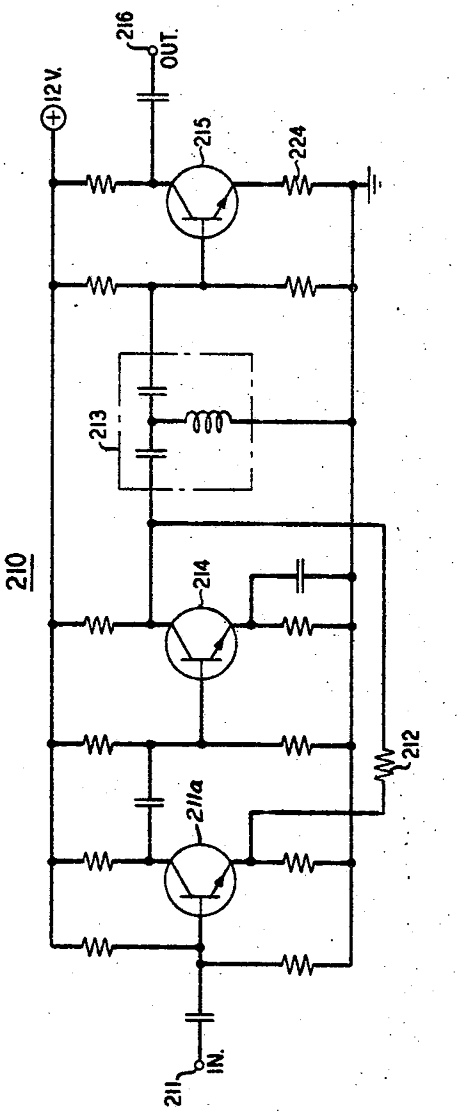
FIG. 17 is a schematic circuit of an amplifier usable in FIG. 2.

Three stage receive amplifier 210 shown in FIG. 17 and used in FIG. 2 in 57–71 kilocycle signaling receiving path 38 at the customer's terminal is essentially identical with three-stage receive amplifier 110 shown in FIGS. 2 and 9 and used in the 13–27 kilocycle signaling transmission path 111 in FIG. 3 at the central office terminal. Amplifier input terminal 211 in FIG. 17 is connected to output terminal 207 of a 57-kc. highpass filter 206*a* whose input terminal 205 is connected to an appropriate terminal of carrier-frequency hybrid coil 100 included in the transmitting and receiving paths 36 and 38, respectively, at the customer's terminal as shown in FIGS. 2, 15 and 17. Filter 206*a* is essentially the same in structure as that of filter 206 in FIG. 15 except the former has a frequency-pass band different from that of the latter. It is noted that the parameters of the components of receive amplifier 210 in FIG. 17 are so selected as to provide for the transmission therethrough of 57–71 kilocycle frequency-modulated carrier voltages whereas the parameters of the components of receive amplifier 110 in FIG. 9 are so selected as to enable the transmission therethrough of 13–27 kilocycle frequency-modulated carrier voltages. As shown in FIG. 17, receive amplifier 210 includes a negative feedback path having resistor 212 and a capacitive-inductive filter 213 connecting the collector of second transistor stage 214 to the base of the third transistor stage 215. The collector output of the third transistor stage is available at output terminal 216. Filter network 213 prevents locally generated 20-kilocycle carrier voltage from erroneously triggering frequency modulation detector 130*a* shown in FIGS. 2 and 18 and discussed hereinafter. Unbypassed resistor 224 provides local feedback for output transistor 215 and thereby a high input impedance therefor. The operation of receive amplifier in FIGS. 2 and 17 is essentially the same as that of receive amplifier 110 in FIGS. 3 and 9 as previously explained.

Frequency-modulation detector 130*a* in FIGS. 2 and 18 designed for use with 57–71 kilocycle frequency-modulated carrier voltages is substantially identical with frequency modulation detector 130 in FIGS. 3 and 10 designed for use with 13–27 kilocycle frequency-modulated carrier voltages. Detector 130*a* includes a transistor output stage 218 whose collector output terminal 219 is connected to input terminal 165 of a voice-frequency filter 166 in FIG. 11. The output of this filter is connected via amplifier 37*a* and its output terminal 172 to winding 33 of hybrid coil 29 in FIGS. 2, 4 and 19. It is noted that amplifier 37*a* used in FIG. 2 differs slightly from amplifier 37 shown in FIG. 11 in that the former has its collector resistor 164 and divider resistor 170 connected to a positive polarity direct current voltage source and its emitter resistor 168 and divider resistor 171 to ground as shown in FIG. 19.

A monostable multivibrator included in frequency modulation detector 130*a* comprises transistors 220 and 221 in FIG. 18 and functions identically with that of monostable transistor multivibrator included in frequency modulation detector 130 in FIGS. 3 and 10 except the former is designed to detect 57–71 kilocycle frequency-modulated carrier voltages. It is noted that the collectors and bases of transistors 218, 220 and 221 in FIG. 18 are energized via appropriate resistors joined to a source 222 of direct current voltage of positive polarity. Input terminal 223 in FIG. 18 is connected to output terminal 216 of receive amplifier 210 in FIGS. 2 and 17.

Briefly, detector 130*a* in operation produces an output positive pulse of about a 6-microsecond duration for each positive portion of each cycle of the input 57–71 kilocycle frequency-modulated carrier voltage. When such input voltage is an unmodulated preselected 64-kilocycle, the detector produces a train of output pulses having uniform time spacing therebetween for a given time interval; when the frequency of the input carrier voltage increases above 64 kilocycles, the detector increases the number of output positive pulses in the given time interval; and when the frequency of the input carrier voltage decreases below the 64-kilocycle frequency, the detector decreases the number of output positive pulses in the given time interval. In other words, the frequency and amplitude variations of the output pulses produced in the output of the detector correspond with the frequency and amplitude variations of the input frequency-modulated carrier voltage in the given time interval. Thus, the average or instantaneous direct current level of the detector output varies with the variations in the frequency and amplitude of the frequency-modulated carrier input voltages. Low-pass filter 166 in FIGS. 2 and 19 derives a signal voltage having the slowly varying frequency and amplitude variations of the pulses produced in the output of detector 130*a* for recovering the voice-frequency modulating voltages in the manner of low-pass filter 166 in FIG. 3 as previously discussed.

Figure 19:
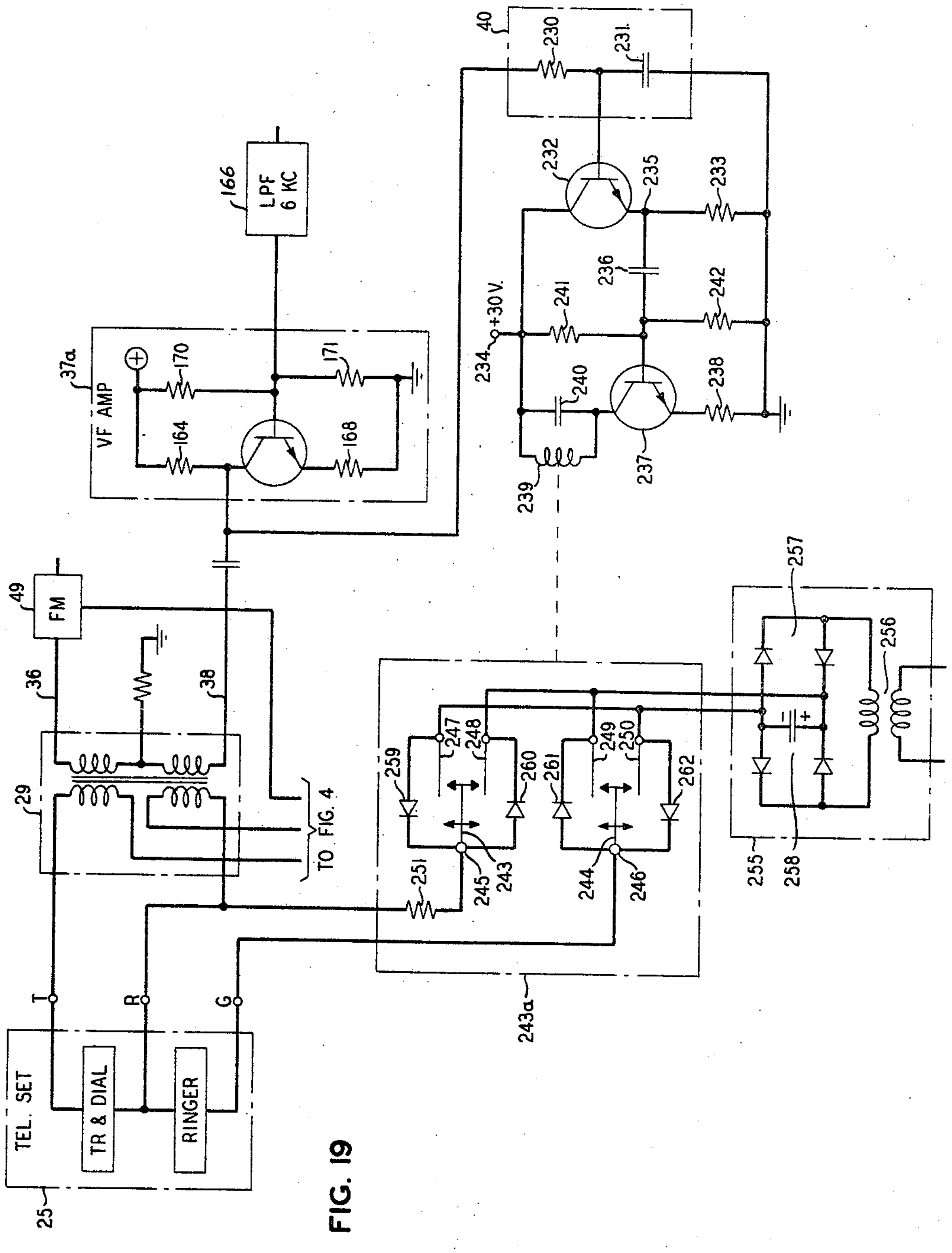
FIG. 19 is a schematic circuit of one type of ringing circuit usable in FIG. 2.

Ringing at customer's terminal, FIGS. 2 and 19

One form of ringing power provided for telephone set 25 at the customer's terminal in FIG. 2 employs a keyed-chopped or commutated technique as shown in FIG. 19. A filter network 40 comprising resistor 230 and capacitor 231 is connected from the collector output of voice-frequency amplifier 37*a* to ground. An emitter follower 232 has its base connected to a common point of the latter resistor and capacitor, its emitter via resistor 233 to ground and its collector to a 30-volt source 234 of direct current voltage of positive polarity. The emitter follower output is available at terminal 235. This circuitry constitutes effectively a high-impedance bridging arrangement in which the filter resistor and capacitor and the emitter follower output connected across the latter capacitor form effectively an R-C filter which attenuates voice-frequency voltages derived from the output of the voice-frequency amplifier but passes the ringing voltage therethrough substantially without attenuation. This precludes voice-frequency voltages from activating a ringing circuit that is presently described. As a consequence, only the preselected 20-c.p.s. ringing voltage is supplied to the ringing circuit.

The 20-c.p.s. ringing voltage at output terminal 235 coupled via capacitor 236 to the base of transistor 237 which has its emitter connected via unbypassed resistor 238 to ground and its collector through an operating winding 239 of an electromagnetic relay to the voltage source 234. Capacitor 240 shunting this winding serves a purpose that is mentioned later. Voltage divider resistors 241 and 242 connected in series between voltage source 234 and ground have a point of predetermined direct current voltage magnitude connected to the base of transistor 237 as a bias so that the latter is biased approximately to cut off. This causes transistor 237 to function both as an amplifier and a rectifier.

A commutator 243*a* comprises relay transfer contacts 243 and 244 associated with relay operating winding 239 and having one end connected to fixed terminals 245 and 246, respectively, and opposite ends movable between two spaced fixed terminals 247 and 248 and 249 and 250, respectively. Fixed terminal 245 is connected via current-limiting resistor 251 to ring terminal R of telephone set 25 while fixed terminal 246 is joined to ground terminal G of the same set. A source 255 of direct current voltage includes a transformer 256 connected to a commercial supply, not shown, of alternating voltage approximately of 110–120 volts. This voltage is rectified by a bridge rectifier 257 which places a direct current voltage charge on capacitor 258 having plate polarities as indicated. Unidirectional devices 259 and 260 are connected across fixed terminal 245 and spaced terminals 247 and 248, respectively, and arranged so that they are poled in directions away from and toward the voltage source, respectively. Unidirectional devices 261 and 262 are connected across fixed terminal 246 and space terminals 249 and 250, respectively, and disposed so that they are poled in directions toward and away from the voltage source, respectively. In other words, the discrete unidirectional devices of the respective device pairs are poled in opposite directions. These devices attenuate the large transient voltages associated with the inductive load of the ringer.

The operation of the ringing circuit of FIG. 19 is effected in such manner that the 20-c.p.s. ringing voltage derived from the output of amplifier 37*a* and transmitted via emitter follower 232 is rectified in amplifier-rectifier 237. The rectified voltage energizes operating winding 239 at the 20-c.p.s. rate whereupon each of its transfer contacts 243 and 244 are caused to engage alternately one of the two terminals of the respective terminal pairs 247 and 248 and 249 and 250, respectively, at the same rate. This applies alternately the positive and negative voltages on the corresponding plates of capacitor 258 to the ring and ground terminals of the telephone set. Assuming, for example, that each of such positive and negative voltages had a value of 80 volts, then the peak-to-peak voltage applied to the ringer of the telephone set is approximately the sum of those two voltages or approximately 160 volts This actuates the ringer of telephone set 25 for indicating the imminence of an incoming call. Capacitor 240 precludes transient signals from operating the ringer.

Figure 20:
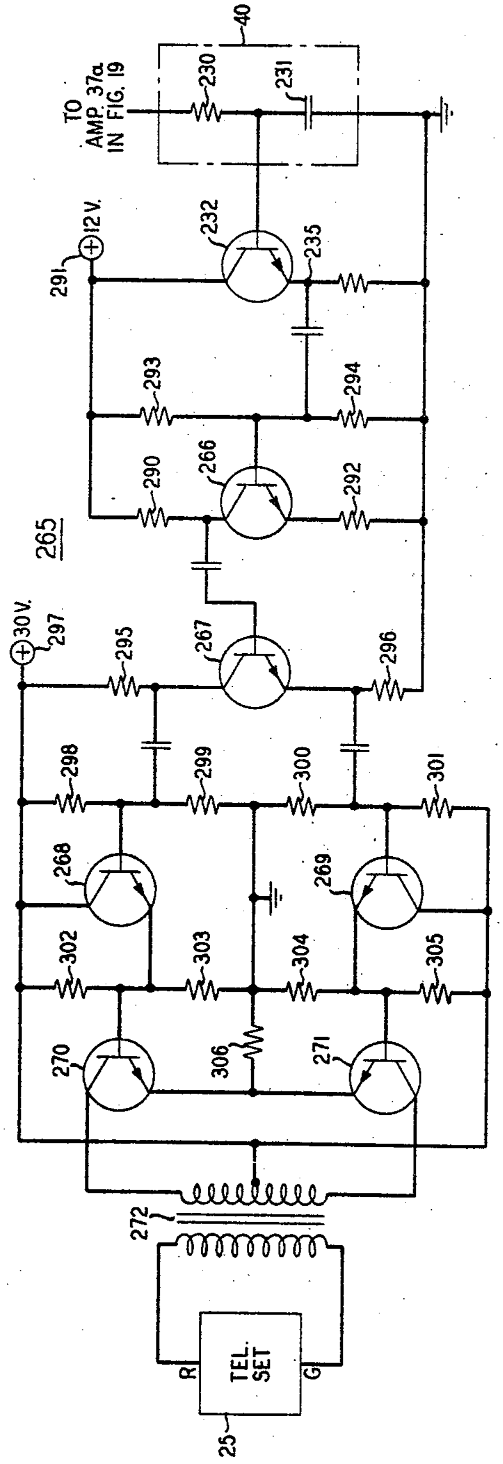
FIG. 20 is a schematic circuit of an alternating type of ringing circuit usable in FIG. 2.

An alternate form of ringing power usable with telephone set 25 at the customer's terminal in FIGS. 2 and 19 and shown in FIG. 20 utilizes a high-impedance bridging network for deriving the 20-c.p.s. ringing voltage from the output of voice-frequency amplifier 37*a* in FIGS. 2 and 19. As in the case of the 20-c.p.s. ringing circuit in FIG. 19, the bridging network includes series resistor 230 and capacitor 231 together with the emitter output of emitter follower transistor 232. This network forms an R-C filter which attenuates voice-frequency voltages but passes the 20-c.p.s. ringing voltage substantially without attenuation. This prevents the voice-frequency voltage from activating the ringing circuit which is presently described.

The 20-c.p.s. ringing voltage obtained from the emitter of emitter follower 232 in FIGS. 2 and 20 is amplified in an amplifying network 265 comprising transistor amplifier 266 having its base coupled to output terminal 235 of the emitter follower and its collector to the base of split-load transistor phase-inverter 267 having collector and emitter outputs connected to the bases of transistor emitter followers 268 and 269, respectively, whose emitters are connected to the bases of transistor amplifiers 270 and 271, respectively, arranged in push-pull. The collectors of the push-pull stage are connected to the opposite ends of a primary winding of an output transformer 272 which has its midpoint joined to a positive 30-volt source 297 of direct current voltage and which has its secondary winding connected across the ring and ground terminals R and G of the telephone set. The output of this amplifying network provides an adequate magnitude of the recovered 20-c.p.s. ringing voltage to actuate the ringer of one or more telephone sets as shown in FIGS. 2 and 19 for indicating the imminence of the incoming call.

Amplifying network 265 in FIGS. 2 and 20 includes further amplifier 266 with its collector connected via resistor 290 to a 12-volt positive voltage source 291 and its emitter via resistor 292 to ground, and series voltage-divider resistors 293 and 294 connected between the 12-volt supply and ground and having a preselected point of voltage magnitude connected to its base. Phase inverter 267 also comprises its collector and base connected via resistors 295 and 296 to a 30-volt positive voltage source 297 and ground, respectively. Emitter follower 268 also includes series voltage divider resistors 298 and 299 connected between the positive 30-volt source and ground and having a preselected point connected to its base for applying a predetermined amount of biasing voltage thereto, and its collector connected to the positive 30-volt source. Emitter follower 269 also comprises series voltage divider 300 and 301 connected between the positive 30-volt source and ground and having a preselected point connected to its base for applying a predetermined amount of biasing voltage thereto, and its collector connected to the last-mentioned source. Push-pull transistor stage 270 also includes series voltage-divider resistors 302 and 303 connected between the positive 30-volt source and ground and having a preselected point connected to its base for applying a predetermined amount of biasing voltage thereto. Push-pull transistor stage 271 includes further voltage divider resistors 304 and 305 connected between the last-mentioned voltage source and ground and having a preselected point connected to its base for applying a predetermined magnitude of biasing voltage thereto. The emitters of both push-pull stages are connected via common resistor 306 to ground.

Figure 21:
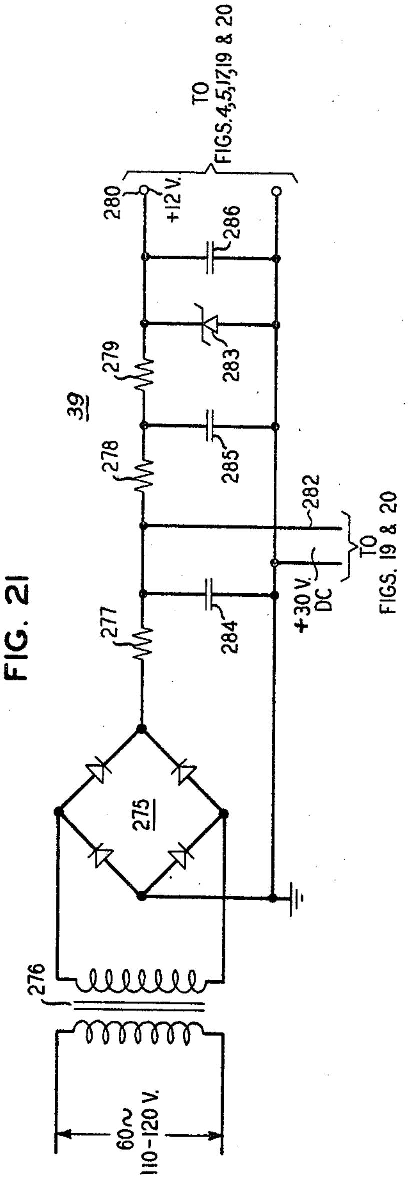
FIG. 21 is a schematic circuit of a power supply usable in FIG. 2.

FIG. 21 delineates a power source 39 for supplying direct current voltage to the equipments shown in FIGS. 4, 5, 17, 18, 19 and 20 and comprises a transformer 276 having its primary winding connected to a commercial supply of alternating current voltage of the order of 110 to 120 volts and having its secondary winding connected to a vertical diagonal of a varistor bridge 275. One terminal of the horizontal diagonal of the bridge is connected to ground and the opposite terminal of this diagonal is connected via series resistors 277, 278 and 279 to an output terminal 280 of positive polarity. Lead 282 connected to a point common to resistors 277 and 278 provides a positive 30-volt source of direct current voltage for use as indicated in the telephone ringing circuits described in regard to and shown in FIGS. 19 and 20. A Zener diode 283 and voltage dropping resistors 278 and 279 establish a positive 12-volt source of regulated direct current voltage at terminal 280 for use as indicated in the several circuits described relative to and illustrated in FIGS. 4, 5, 17, 19 and 20. Capacitors 284, 285 and 286 pass extraneous alternating current voltages to ground.

Operation of carrier system in FIGS. 2 and 3
Outgoing call from customer's technical In the operation of the voice-frequency telephone system shown in FIGS. 2 and 3, it is understood therein that a telephone set 20 in the customer's terminal in one geographical area in FIG. 2 and a main distributing frame of the central office in a different geographical area in FIG. 3 function to provide a first telephone channel effective in the voice-frequency range in opposite directions on a 2-wire customer's line extending therebetween in a familiar manner. It is also understood that the central office operates to route outgoing calls from the telephone set 20 and incoming calls thereto in the well-known manner. For the purpose of facilitating this description, it is further understood as hereinbefore mentioned that the central office performs essentially the several operations of initiating and carrying on a telephone conversation inherent in a normal telephone set 25 which is identical with telephone set 20 as subsequently mentioned herein, and that the following explanation involves only the operation of the carrier system in FIGS. 2 and 3.

Let it be initially assumed that the carrier telephone system of FIGS. 2 and 3 lies in a state of non-use in the respect that telephone set 25 at the customer's terminal is resting in an on-hook state and the main distributing frame in the central office is also resting in a similar state insofar as the latter set is concerned. This means that switch 50 in FIG. 4 is in an open condition with the significance attached thereto as above mentioned regarding this figure. As a first step, thereafter, a user actuates telephone set 25 in FIG. 4 to an off-hook state which in a familiar type of telephone set involves the lifting of a transmit-receiver handset from its cradle. This actuation, it is recalled from the previous explanation of FIG. 4, closes switch 50 to complete an energizing circuit for relay operating winding 46 which thereupon closes its contact 47. This supplies a direct current voltage of positive polarity to preselected contact 48 in frequency modulator 49 shown in FIGS. 4 and 5. This voltage renders the frequency modulator operative to transmit an unmodulated 20-kc. carrier voltage via emitter follower 89, low-pass filter 95, carrier-frequency hybrid coil 100, and frequency-separation filter 104 in sequence to the 2-wire line at the customer's terminal in FIG. 2. At the central office terminal in FIG. 3, the unmodulated 20-kc. carrier voltage is received from the 2-wire line by frequency-separation filter 104, carrier-frequency hybrid coil 100, low-pass filter 95, amplifier 110 and amplifier-rectifier 195 in sequence in FIGS. 3 and 13. In FIG. 3, the received and amplifier 20-kc. unmodulated carrier voltage energizes relay operating winding 197 which is thereupon activated to close its contact 185 to complete a direct-current circuit through voice-frequency hybrid coil 176 and the main distributing frame. This indicates to the main distributing frame that telephone set 25 at the customer's terminal is in the off-hook state and is ready to initiate an outgoing call by going into a dial-pulsing operation. The central office returns dial tone to the customer in a manner that is subsequently mentioned.

As a second step of initiating an outgoing call from telephone set 25 in the off-hoook state at the customer's terminal in FIG. 4, the user of the set proceeds with the dial-pulsing operation thereof. As switch 50 is alternately closed and opened to represent each digit of a desired telephone number to be called for this purpose, the series circuit traced above and including relay operating winding 46 is also alternately energized and deenergized whereby its contact 47 is correspondingly alternately closed and opened to apply interruptedly the positive voltage of voltage supply 39 to preselected contact 48 in the frequency modulator 49. This renders the frequency modulator alternately operative and inoperative whereby it is caused to transmit a series of unmodulated 20-kc. carrier pulses for each digit of the desired telephone number to be called to the dial pushing recognition circuit in FIGS. 3 and 13 via the 2-wire line and the sequence of equipments connected therewith as previously identified.

The series of pulses representing each digit serves to alternately energize and deenergize relay winding 197 in FIG. 13 thereby alternately closing and opening relay contact 185 associated therewith for alternately closing and opening the circuit including this contact and windings 182 and 186 of voice-frequency hybrid coil 176. These alternate closings and openings are recognized as dial pulses by the central office in FIGS. 3 and 13 as the desired telephone number of the outgoing call. Thereupon, the central office proceeds to process the dial pulses to connect telephone set 25 at the customer's terminal to the desired telephone number at a distant telephone station in the well-known manner. It may now be assumed that the calling telephone set 25 at the custmer's terminal in FIG. 2 and the desired distant telephone set are interconnected for talking purposes via the central office in FIG. 3.

As a third step, it is further assumed for the purpose of this explanation that the talking in the ensuing conversation is initiated at telephone set 25 in the customer's terminal in FIG. 2 although it is recognized that in most normal telephone connections the talking is usually commenced at the telephone set of the called party. At this time, it is recalled that the telephone set 25 is still in the off-hook state so that relay contact 47 is closed thereby supplying positive voltage to preselected contact 48 in the frequency modulator 49 in FIGS. 4 and 5 for establishing an operative condition therein. Now, the voice-frequency voltages originating with the user of telephone set 25 are passed through hybrid coil 29 and transmitting path 36 in FIGS. 2 and 4 to injut terminal 54 of voice-frequency amplifier 35 in FIG. 5. These voice-frequency voltages activate the latter modulator to produce at its output terminal 94 output oscillators varying in frequency in correspondence with the varying frequencies of the voice-frequency voltages relative to the preselected 20-kc. frequency carrier voltage. These frequency modulated carrier voltages are applied to the 2-wire customer's line for transmission to the central office.

At the central office terminal in FIG. 3, the frequency modulated carrier voltages taken from the 2-wire line are applied to input terminal 149 of frequency modulation detector 130 in FIGS. 3 and 10 which produces one positive output voltage pulse for each positive portion of the input frequency modulated carrier voltages. The frequency of the pulses produced in the output of the detector varies slowly in correspondence with the slowly varying frequency deviations of the voice-frequency modulated 20-kc. carrier voltages. A voltage corresponding to the frequency of the detector output pulses is recovered in low-pass filter 166. The recovered voice-frequency voltage is applied via voice-frequency hybrid coil 176 to the main distributing frame for routing to the called party. This completes the outgoing call from local telephone set 25 in FIG. 2 to a called party through the central office by the dial pulsing operation initiated at the latter set. Upon completion of the call, the user of telephone set 25 returns the latter to the on-hook state by replacing the handset on the cradle. This telephone set is now in condition to initiate another outgoing call and/or to receive an incoming call.

Incoming call to customer's terminal via central office terminal

When an incoming call is being routed by the central office in FIG. 3 to telephone set 25 in FIG. 2 the former transmits a 20-c.p.s. ringing voltage through capacitor 187 in FIG. 13 and voice-frequency hybrid coil 176, amplifier terminal 179, amplifier 180 and emitter follower 201 to frequency modulator **49*a* included in sequence in transmitting path 96 in FIGS. 3, 12 and 14. The 20-c.p.s. ringing voltage modulates the preselected 64-kc. carrier voltage in frequency modulator 49*a*, and the carrier voltage so frequency modulated is applied via carrier filter 206, carrier frequency hybrid coil 100, and frequency-splitting filter 104 in sequence in the transmitting path 96 to 2-wire line 22 at the central office terminal in FIG. 3 and via the 2-wire line, frequency-splitting filter 104, carrier frequency hybrid coil 100, carrier filter 206*a*, and carrier receive amplifier 210 to frequency detector 130*a* in sequence in receiving path 38 at the customer's terminal in FIGS. 2, 17 and 18. The 20-c.p.s. ringing voltage recovered by low-pass filter 166 from the output of FM detector 130*a* is equivalent to that initiated at the main distributing frame and is amplified in voice-frequency amplifier 37*a***.

In the one form of ringing circuit at the customer's terminal shown in FIGS. 2 and 19, the recovered 20-c.p.s. ringing voltage in amplified form is now applied by filter 40 and emitter follower 232 to rectifier 237 in sequence in the receiving path at the customer's terminal in FIGS. 2 and 19. The 20-c.p.s. ringing voltage in rectified form serves to alternately energize and deenergize the associated relay winding 239. This actuates commutator **243*a* to apply alternately the positive and negative voltage of capacitor 258 to the ringer in telephone set 25 in the manner described above whereby the latter is activated to indicate the imminence of the incoming call. In the alternate form of ringing circuit at the customer's terminal as shown in FIGS. 2 and 20, the recovered 20-c.p.s. ringing voltage in amplified form is applied via filter 40 and emitter follower 232 to amplifier 265 whose output is applied in a further amplified form to the ringer included in telephone set 25. The further amplified recovered 20-c.p.s. ringing voltage is now provided with adequate magnitude to activate the ringer in telephone set 25** in the common manner for indicating the imminence of the incoming call.

In response to such ringing via either the circuit of FIG. 19 or that of FIG. 20, a user of telephone set 25 in FIGS. 2 and 4 picks up the handset from its cradle for the purpose of answering a call. In order to simplify the showing of the connection in the telephone set for this explanation, it is assumed that switch 50 is now closed across the tip and ring terminals T and R, respectively, as in the off-hook state in FIG. 4 whereby the telephone set is now conditioned for incoming talking as well as for outgoing talking, the latter having been just explained. It is to be noted here that when the user lifts the handset to the off-hook state, direct current flows in the circuit of FIG. 4 to activate modulator 49 to transmit an unmodulated 20-kc. signal to the central office. This signal at the central office operates a dial pulse and supervisory relay, not shown, to initiate a flow of direct current thereat. As soon as this current begins to flow the central office trip relay, not shown, releases the ringing trunk and a voice connection via the carrier loop is completed.

At this point it is understood that while two-way voice transmission is provided at all times after the completion of the call, it is assumed for this explanation that the initial talking is commenced at the telephone set of the distant calling party connected to the main distributing frame in FIG. 3, although it is most likely to commence in the telephone set of the called party. The voice-frequency alternating current voltages initiated by the calling party follow the path just traced for the 20-c.p.s. ringing voltage applied at the main distributing frame. Briefly, these voice-frequency voltages are utilized to frequency-modulate the 64-kc. carrier voltage in frequency modulator **49*a* at the central office terminal, and these frequency modulated carrier voltages are detected in FM detector 130*a* and low-pass filter 166 at the customer's terminal in FIG. 2 to recover voice-frequency voltages equivalent to those initiated by the calling party. The recovered voice-frequency voltages amplified in voice-frequency amplifier 37*a* are passed through voice-frequency hybrid coil 29 to called telephone set 25** in FIGS. 2 and 4 for reception thereby as it is now in the off-hook state as just mentioned. The voice-frequency responses of the called party at the customer's terminal in FIG. 2 are transmitted to the calling party in the manner above described for a call initiated at the customer's terminal. It is now evident that the dial tone returned to the customer's terminal at the off-hook indication in the central office terminal during the initiation of an outgoing call from the customer's terminal as above mentioned is transmitted in the manner just explained for the transmission of ringing and voice-frequency voltages thereto.

While the aforedescribed invention is disclosed with regard to the provision of adding one two-way carrier channel to a 2-wire customer's line extending between a central office terminal and a customer's terminal and transmitting voice-frequency voltages on the line between such terminals, it is apparent that the disclosed invention can be expanded to include two or more additional 2-way carrier channels on the same 2-wire customer's line. This would involve appropriate adjustments of the parameters of the additional equipments utilized in such expanded carrier system, and the termination of individual customers at discrete intermediate geographical points lying between the central office terminal and the farthest customer. In such expanded system, it is possible that power for the carrier equipments located at the several different geographical points can be supplied from the central office terminal to the several customers on the same 2-wire line, as well as to any repeaters used on the line. It is further apparent that the invention is also compatible with an alternating current signaling system.

It is understood that the invention herein is described in specific respects for the purpose of this disclosure. It is to be further understood that such respects are merely illustrative of the application of the principles of the invention. Numerous other arrangements may be devised by those skilled in the art without departing from the spirit of the invention.

What is claimed is:

1. In combination with a two-way voice-frequency channel in a telephone system, comprising:

a customer's terminal;

a central office terminal;

a customer's voice-frequency two-way signaling line extending between said customer's and central office terminals;

a first customer's telephone set voice-frequency coupled to said line at said customer's terminal;

and voice-frequency signaling means coupled to said line at said central office terminal; whereby said two-way voice-frequency channel is provided on said line;

means for providing a two-way carrier-frequency channel on said line, comprising:

a second customer's telephone set at said customer's terminal;

first astable multivibrator modulating means voice-frequency coupled to said second telephone set and carrier-frequency coupled to said line at said customer's terminal; said modulating means initially energized to provide a first carrier voltage having a preselected frequency and subsequently activated by voice-frequency voltage outgoing from said second telephone set to vary the frequency of said first carrier voltage relative to said preselected frequency in correspondence with the varying frequency of said outgoing voice-frequency voltage;

first monostable multivibrator demodulating means carrier-frequency coupled to said line and voice-frequency coupled to said signaling means at said central office terminal; said demodulating means initially biased to an inoperative condition and subsequently actuated to successively discrete operative conditions to provide output voltage pulses fixed in number within a first given time interval in response to positive cycles of said first carrier voltage in unmodulated form and other output voltage pulses varying in number relative to said fixed number within said first given time interval in response to positive cycles of said first varying frequency carrier voltage derived from said line for producing voice-frequency voltage representing said outgoing call voice-frequency voltage at said signaling means;

second astable multivibrator modulating means voice-frequency coupled to said signaling means and carrier-frequency coupled to said line at said central office terminal; said second modulating means initially biased to provide a second carrier voltage having a preselected frequency different from said first carrier voltage preselected frequency and subsequently activated by voice-frequency voltage incoming as an incoming call to said signaling means to vary the frequency of said second carrier voltage relative to said different frequency in correspondence with the varying frequency of said incoming voice-frequency voltage;

and second monostable demodulating means carrier-frequency coupled to said line and voice-frequency coupled to said second telephone set at said second customer's terminal; said second demodulating means initially biased to an inoperative condition and subsequently activated to successively discrete operative conditions to provide output voltage pulses fixed in number within a second given time interval in response to positive cycles of said second carrier voltage in unmodulated form and further output voltage pulses varying in number relative to said last-mentioned fixed number within said second given time interval in response to positive cycles of said second varying frequency carrier voltage derived from said line for producing voice-frequency voltage representing said incoming call voice-frequency voltage at said second telephone set; whereby said two-way carrier-frequency channel is provided on said line.

2. The combination according to claim 1 in which said first modulating means includes a preselected contact which is deenergized to hold said last-mentioned means in an inoperative condition to discontinue said first carrier voltage when said second telephone set is in an on-hook state and in which said customer's terminal includes direct current voltage means for continuously applying direct current voltage of predetermined polarity to said contact to activate said last-mentioned modulating means to an operative condition for continuously providing said first carrier voltage in unmodulated form when said second telephone set is changed to an off-hook state, whereby an indication is made at said central office signaling means of the imminence of said outgoing call before said outgoing and incoming carrier voltages are provided at said second telephone set and signaling means, respectively.

3. The combination according to claim 2 in which said second telephone set includes dial pulsing means operated in dial pulsing actuations to control said direct voltage means for interrupting said current voltage applied to said preselected contact while said second telephone set is in said off-hook state, whereby said last-mentioned contact is intermittently energized to activate said first modulating means into intermittently operative conditions to provide pulses of said first unmodulated carrier voltage to said line as the desired address of an outgoing call in correspondence with said dial pulsing actuations for providing an indication of the desired address of the outgoing call to said central office signaling means before said outgoing and incoming voice-frequency voltages are provided at said second telephone set and central office signaling means, respectively.

4. In combination with a two-way voice-frequency channel in a telephone system, comprising:

a customer's terminal;

a central office terminal;

a customer's voice-frequency two-wire line extending between said customer's and central office terminals;

a first customer's telephone set voice-frequency coupled to said line at said customer's terminal;

a voice-frequency signaling means coupled to said line at said central office terminal; whereby said two-way voice-frequency channel is provided on said line;

means for providing a two-way carrier-frequency channel on said line, comprising:

a second customer's telephone set at said customer's terminal;

first astable multivibrator modulating means voice-frequency coupled to said second telephone set and carrier-frequency coupled to said line at said customer's terminal; said last-mentioned means including a preselected contact initially energized by a direct current voltage of predetermined polarity to activate said modulating means to provide a first output carrier voltage having a preselected frequency;

direct current voltage means initially controlled by an on-hook state of said second telephone set to interrupt said first predetermined voltage to said preselected contact to deactivate said modulating means for discontinuing said first carrier voltage and further controlled by an off-hook state of said second telephone set to continuously apply said first predetermined voltage to said preselected contact for continuously activating said modulating means to continuously apply said first carrier voltage in unmodulated form to said line as an indication of the imminence of an outgoing call to said signaling means;

dial pulsing means included in said second telephone set and operated in dial pulsing actuations for additionally controlling said voltage means to intermittently interrupt said first predetermined voltage at said preselected contact for intermittently activating said first modulating means to transmit pulses of said first unmodulated carrier voltages to said line as the desired address of the outgoing call in correspondence with said dial pulsing actuations for providing an indication of the outgoing call address to said central office signaling means;

said first modulating means additionally activated by voice-frequency voltage during the outgoing call to vary the frequency of said first carrier voltage relative to said preselected frequency in correspondence with the varying frequency of the outgoing voice-frequency voltage;

first monostable multivibrator demodulating means carrier frequency coupled to said line and voice-frequency coupled to said signaling means at said central office; said demodulating means initially biased to on an inoperative condition and subsequently activated to successively discrete operative conditions to provide output voltage pulses fixed in number within a given time interval in response to positive cycles of said first unmodulated carrier voltage and other output voltage pulses varying in number relative to said fixed number within said fixed time interval in accordance with the positive cycles of said first varying frequency carrier voltage derived from said line for producing voice-frequency voltage representing said outgoing voice-frequency voltage at said signaling means;

second astable multivibrator modulating means voice-frequency coupled to said central office signaling means and carrier-frequency coupled to said line at said central office terminal; said last-mentioned modulating means initially biased to provide a second output carrier voltage having a preselected frequency different from said first carrier voltage preselected frequency and subsequently activated by voice-frequency voltage incoming as an incoming call to said signaling means to vary the frequency of said second carrier voltage relative to said different frequency in correspondence with the varying frequency of said incoming voltage;

and second monostable multivibrator modulating means carrier-frequency coupled to said line and voice-frequency coupled to said second telephone set at said customer's terminal, said last-mentioned demodulating means initially biased to an inoperative condition and subsequently activated to successively discrete operative conditions to provide output voltage pulses fixed in number within a second given time interval in response to positive cycles of said unmodulated second carrier voltage and further output voltage pulses varying in number relative to said last-mentioned fixed number within said second given time interval in response to positive cycles of said second varying frequency carrier voltage for producing voice-frequency voltage representing said incoming call voice-frequency voltage at said second telephone set; whereby said two-way carrier-frequency channel is provided on said line.

5. In combination with a voice-frequency telephone system, comprising:

a customer's terminal;

a central office terminal;

a customer's voice-frequency two-wire line extending between said customer's and central office terminals;

a first customer's telephone set voice-frequency coupled to said line at said customer's terminal;

voice-frequency signaling means coupled to said line at said central office terminal; whereby said two-way voice-frequency channel is provided on said line;

means for providing a two-way carrier-frequency signaling channel on said line, comprising:

a second customer's telephone set at said customer's terminal;

first astable multivibrator modulating means positioned at said customer's terminal and including a preselected contact initially energized by a direct current voltage of predetermined polarity to activate said first modulating means to provide a first carrier voltage having a predetermined frequency;

direct current voltage means initially controlled by an on-hook state of said second telephone set at said customer's terminal to interrupt said predetermined voltage to said preselected contact to deactivate said first modulating means for discontinuing said first carrier voltage and further controlled by an off-hook state of said second telephone set to continuously apply said predetermined voltage to said preselected contact for continuously activating first modulating means to continuously provide said first carrier voltage to indicate the imminence of an outgoing call to said signaling means;

dial pulsing means included in said second telephone set and operated in dial pulse actuations for additionally controlling said direct voltage means to intermittently interrupt said predetermined voltage for intermittently activating said first modulating means to provide pulses of said first carrier voltage as the desired address of the outgoing call in correspondence with said dial-pulse actuations to indicate the desired outgoing call address to said central office signaling means;

said first modulating means additionally activated by voice-frequency voltage during the outgoing call to vary the frequency of said first carrier voltage relative to said preselected frequency in correspondence with the varying frequency of said outgoing voice-frequency voltage;

first monostable multivibrator demodulating means initially biased to an inoperative condition and subsequently activated to successively discrete operative conditions to provide output voltage pulses fixed in number within a given time period in response to positive cycles of said first unmodulated carrier voltage and other output voltage pulses varying in number relative to said fixed number within said fixed time interval in accordance with the positive cycles of said first varying frequency carrier voltage derived from said line for producing voice-frequency voltage representing said outgoing voice-frequency voltage of said signaling means;

second astable multivibrator modulating means positioned at said central office terminal and initially biased to provide a second output carrier voltage having a preselected frequency different from said first carrier voltage preselected frequency and subsequently activated by a voice-frequency voltage incoming as an incoming call to said signaling means to vary the frequency of said second carrier voltage in correspondence with the varying frequency of said incoming voltage;

second monostable multivibrator demodulating means positioned at said customer's terminal and initially biased to an inoperative condition and subsequently activated to successively discrete operateive conditions to provide output voltage pulses fixed in number within a second given time interval in response to positive cycles of said unmodulated second carrier voltage and other output voltage pulses varying in number relative to said last-mentioned fixed number within said second given time interval in response to positive cycles of said second frequency varying carrier voltage for producing a voice-frequency voltage representing said incoming call voice-frequency voltage of said second telephone set;

first hybrid coil means at said customer's terminal for voice-frequency coupling said second telephone set to an input of said first modulating means and an output of said second demodulating means;

second hybrid coil means at said customer's terminal for carrier-frequency coupling said line to an output of said first modulating means and an input of said second demodulating means;

third hybrid coil means at said central office terminal for carrier-frequency coupling of said line to an input of said first demodulating means and an output of said second modulating means;

and fourth hybrid coil means at said central office terminal for voice-frequency coupling said signaling means to an output of said first demodulating means and an input of said second modulating means; whereby said two-way carrier-frequency channel is provided on said line.

6. The combination according to claim 5 in which said first astable multivibrator modulating means comprises:

a pair of transistors, each having a base, a collector and an emitter;

a first capacitor connecting the collector of one of said transistors to the base of the other;

a second capacitor connecting the collector of the other transistor to the base of the one;

impedance means having a first terminal connected to ground potential;

a pair of unidirectional devices, each connecting the emitter of the one and other transistors to a second terminal of said impedance means and poled in a direction toward said last-mentioned terminal;

a pair of resistors having corresponding first terminals connected to a common point, one of said resistors having a second terminal connected to a point common to said first capacitor and other transistor base and the other of said resistors having a second terminal connected to a point common to said second capacitor and one transistor base;

resistance means connecting the collectors of the one and other transistors to said direct current voltage means;

input emitter follower means coupling said resistor pair common point to said first hybrid coil means, said last-mentioned emitter coupling means comprising a third transistor having a base coupled to said last-mentioned hybrid coil means, an emitter connected to said resistor pair common point, and a collector connected to said last-mentioned voltage means;

and output emitter follower means coupling said other transistor collector to said second hybrid coil means.

7. The combination according to claim 5 in which first monostable multivibrator demodulating means comprises:

a pair of transistors, each having a base, a collector and an emitter;

a capacitor coupling the collector of one of said transistors to the base of the other, said one transistor base coupled to said third hybrid coil means and said other transistor collector coupled to said fourth hybrid coil means;

a first resistor having one terminal connected to a point common to said capacitor and other transistor base and a second terminal connected to ground potential;

resistance means connecting the collectors of said one and other transistors to ground potential;

a second resistor connected in a feedback circuit extending between said other transistor collector and said one transistor base;

a third resistor connecting said one transistor emitter to a direct current terminal having a potential different from ground potential;

and a unidirectional device connecting said other transistor emitter to said last-mentioned terminal.

8. The combination according to claim 5 in which said dial pulsing means comprises:

tip and ring terminals included in said second customer's telephone set;

a primary winding included in said first hybrid coil means and connected across said tip and ring terminals;

positive and negative polarity terminals included in said voltage means and connected in a series circuit with said tip and ring terminals and primary winding;

a relay operating winding connected in said series circuit to a predetermined one of said positive and negative polarity terminals;

a relay contact having one end fixedly joined to said last-mentioned predetermined polarity terminal and an opposite end detachably connected to a fixed terminal connected to said preselected contact in said first modulating means;

whereby said on-hook state of said second customer's telephone set opens said series circuit to deenergize said relay winding to disengage said movable contact from said fixed terminal for deenergizing said preselected contact to hold said first modulating means in the inoperative condition;

said off-hook state of said second customer's telephone set closing said series circuit to energize said relay winding to move said relay contact to engage said fixed contact for applying said predetermined polarity voltage to said preselected contact to activate said first modulating means into the operative condition to continuously provide said first carrier voltage in unmodulated form;

and said dial pulse actuations during said off-hook state intermittently closing and opening said series circuit to intermittently energize said relay winding to intermittently engage said relay contact with said fixed terminal to intermittently energize said preselected contact for intermittently activating said first modulating means into intermittently operative conditions to provide pulses of said first carrier voltage in correspondence with said last-mentioned dial pulse actuations.

9. The combination according to claim 5 in which said second frequency-modulating means comprises a multivibrator including:

a pair of transistors, each having a base, a collector and an emitter;

a first capacitor connecting the collector of one of said transistors to the base of the other;

a second capacitor connecting the collector of the other transistor to the base of the one transistor;

impedance means having a first terminal connected to a voltage terminal of negative polarity;

a pair of unidirectinal devices each connecting the emitter of said one and other transistors to a second terminal of said impedance means and poled in a direction toward said last-mentioned terminal;

a pair of resistors having corresponding first terminals connected to a common point, one of said resistors having a second terminal connected to a point common to said first capacitor and other transistor base, and the other of said resistors having a second terminal connected to a point common to said second capacitor and one transistor base;

resistive means connecting the collectors of said one and other transistors to ground potential;

input emitter follower means coupling said common point of resistor pair to said fourth hybrid coil means, said last-mentioned coupling means comprising an emitter follower including a third transistor having a base coupled to said last-mentioned hybrid coil means, an emitter connected to said resistor pair common point, and a collector connected to ground potential;

and emitter follower output means coupling said other transistor collector to said third hybrid coil means.

10. The combination according to claim 5 in which said second frequency-demodulating means comprises a multivibrator including:

a pair of transistors, each having a base, a collector and an emitter;

a capacitor coupling the collector of one of said transistors to the base of the other; said one transistor base coupled to said third hybrid coil means and said other transistor collector coupled to said first hybrid coil means;

a first resistor having one terminal connected to a point common to said capacitor and other transistor base and a second terminal connected to a positive direct voltage terminal;

resistance means connecting the collectors of said one and other transistors to said last-mentioned voltage terminal;

a second resistor connected in a feedback circuit extending from said other transistor collector to said one transistor base;

a third resistor connecting said one transistor emitter to a ground potential terminal;

and a unidirectional device connecting said other transistor emitter to a ground terminal and poled in a direction toward said last-mentioned terminal.

11. In combination with a voice-frequency telephone system, comprising: a customer's terminal; a central office terminal; a customer's voice-frequency two-wire line extending between said customer's and central office terminal; voice-frequency signaling means coupled to said line at said central office terminal; whereby said two-way voice-frequency channel is established on said line;

means for providing an incoming ringing-frequency signaling channel on said line, comprising:

a second telephone set at said customer's terminal;

astable multivibrator modulating means voice-frequency coupled to said signaling means and carrier-frequency coupled to said line at said central office terminal; said modulating means initially energized to provide an output carrier voltage of a preselected frequency; said signaling means providing an alternating current ringing voltage of a frequency different from said carrier voltage frequency as an indication of an incoming call to activate said modulating means to vary the frequency of said carrier voltage relative to said preselected frequency in accordance with the different frequency of said ringing voltage;

and monostable multivibrator demodulating means carrier-frequency coupled to said line at said customer's terminal; said demodulating means initially biased to an inoperative condition and subsequently activated to successively discrete operative conditions to provide output voltage pulses fixed in number within a given time interval and other output voltage pulses varying in number relative to said fixed number in said given time interval in accordance with the positive cycles of said varying frequency carrier voltage derived from said line for producing an alternating current voltage having a frequency identical with the ringing voltage different frequency and representing said last-mentioned ringing voltage at said customer's terminal;

and frequency-selective means for utilizing the representing alternating current voltage derived from an output of said demodulating means to activate said second telephone set for indicating the incoming call thereto; whereby said ringing-frequency signaling channel is provided on said line.

12. The combination according to claim 11 in which said frequency-selective means comprises:

reactive bridge network means at said customer's terminal for selecting the representing alternating current voltage from the output of said demodulating means and attenuating alternating current of frequencies higher than the frequency of the last-mentioned representing voltage; and amplifying means for amplifying the selected representing alternating current voltage to activate said second telephone set.

13. The combination according to claim 12 in which said frequency-selective means comprises:

reactive bridge network means at said customer's terminal for selecting the representing alternating current voltage from the output of said demodulating means and attenuating alternating current of frequencies higher than the frequency of the last-mentioned representing voltage;

means for rectifying said representing voltage derived from said bridge network means to provide a direct current voltage, including:

a transistor having a base, a collector and an emitter, said base coupled to an output of said bridge network means, said emitter connected to ground, and said collector connected to a direct current voltage terminal having a polarity different from ground;

and a voltage divider connected between said last-mentioned direct current voltage means and ground and having a point of preselected direct current voltage magnitude connected to said transistor below cut-off to cause the operation thereof as a rectifier;

a relay operating winding connected in series between said transistor collector and different voltage terminal;

a first relay transistor contact having one end permanently connected to a first fixed terminal and an opposite end movable to engage a second fixed terminal and a third fixed terminal, one at a time;

a second relay transfer contact having one end permanently connected to a fourth fixed terminal and an opposite end movable to engage a fifth fixed terminal and sixth fixed terminal, one at a time; said first and second transfer contacts normally disposed between said second and third and fifth and sixth terminals, respectively;

a ringer included in said second telephone set and connected between said first and fourth terminals;

a source of direct current voltage having a terminal of positive polarity connected to said transfer contact third and fifth terminals and a terminal of negative polarity connected to said transfer contact second and sixth terminals;

and a plurality of unidirectional devices of which a first device bridges said transfer contact first and second terminals, a second device bridges said transfer contact first and third terminals, said first and second devices poled in directions toward and away from said transfer contact first terminal, respectively; a third device bridges said transfer contact fourth and fifth terminals and a fourth device bridges said transfer contact fourth and sixth terminals, said third and fourth devices poled in directions away from and toward said transfer contact fourth terminal, respectively;

said relay winding alternately energized and deenergized by the rectified output of said rectifying means to actuage said first and second transfer contacts between said transfer contact second and third terminals and fifth and sixth terminals, respectively, for alternately applying said source positive and negative voltages in predetermined peak-to-peak magnitudes across said ringer to cause the actuation thereof.

14. A telephone system comprising in combination; a customer's terminal; a central office terminal; a two-way signaling line extending between said customer's and central office terminals; a first customer's telephone set voice-frequency coupled to said line at said customer's terminal, and signaling means voice-frequency coupled to said line at said central office terminal; whereby a two-way voice frequency channel is provided on said line;

and means for providing a carrier-frequency channel on said line, comprising:

a free-running multivibrator modulating means positioned at said customer's terminal;

a preselected contact included in said modulating means and initially energized with a direct current voltage of predetermined polarity to activate said last-mentioned means to produce an output carrier voltage having a preselected frequency;

tip and ring terminals included in said second telephone set;

a voice-frequency hybrid coil means having two primary windings and a secondary winding, a first end of one of said primary windings connected to said tip terminal and a first end of the other of said primary windings connected to said ring terminal; said secondary winding coupled to an input of said modulating means;

carrier frequency-selective means for coupling an output of said modulating means to said line at said customer's terminal;

a source of direct current voltage having a positive terminal connected to a second end of said one primary winding and a negative terminal to a second end of said other primary winding;

a relay operating winding connected in a series circuit including one of said source terminals of predetermined polarity, said one primary winding, tip and ring terminals, said other primary winding, and the other of said source terminals;

a relay contact having one end connected to said predetermined polarity source terminal and an opposite end detachably connectable to said first modulating means contact;

said series circuit being opened during an on-hook state of said second telephone set to deenergize said relay winding to disconnect said relay contact from said first modulating means for activating said last-mentioned means to an inoperative condition; said series circuit being closed during an off-hook state of said second telephone set to energize said relay winding to actuage said relay contact to connect said source predetermined voltage polarity terminal to said first modulating means contact to activate said first modulating means to an operative condition for continuously applying said carrier voltage at said preselected frequency in unmodulated form to said line to indicate the imminence of an outgoing call from said second telephone set;

said series circuit alternately closed and opened as said second telephone set is operated in dial pulsing actuations for the outgoing call to alternately energize and deenergize said relay operating winding for alternately actuating said relay contact to connect said source predetermined voltage polarity terminal to said first modulating means contact and to disconnect said last-mentioned terminal from said last-mentioned contact to alternately activate said first modulating means to operative and inoperative conditions to apply pulses of said carrier voltage to said line to indicate the address of the outgoing call to said central office signaling means;

said first modulating means further activated by voice-frequency voltage outgoing from said second telephone set to vary the frequency of said carrier voltage relative to said preselected frequency in correspondence with the varying frequency of said last-mentioned voice-frequency voltage for transmitting outgoing voice-frequency voltage to said line and signaling means; whereby said carrier-frequency channel is provided on said line.

15. The telephone system according to claim 14 in which said free-running multivibrator modulating means comprises:

a pair of transistors, each having a base, a collector and an emitter;

a first capacitor coupling the collector of one transistor to the base of the other;

a second capacitor coupling the collector of said other transistor to the base of said one transistor; said last-mentioned collector also coupled to said carrier-frequency selective means;

common impedance means connecting the emitters of said one and other transistors to ground potential;

a pair of unidirectional devices connected between said common impedance and respective emitters and poled in directions away from said last-mentioned emitters;

a pair of resistors having corresponding terminals connected to a common point, one of said resistors having another terminal connected to a point common to said first capacitor and other transistor base and a second of said resistors having another terminal connected to a point common to said second capacitor and one transistor base;

resistance means connecting the collectors of said one and other resistors to said modulating means preselected contact;

and a three-terminal variable impedance means coupling said hybrid means secondary winding to said modulating means input, said last-mentioned coupling means having one terminal connected to one end of said last-mentioned winding which has an opposite end connected to ground potential, a second terminal connected to said modulating means preselected contact, and a third terminal connected to said resistor pair common point; said coupling means supplying varying amounts of current through said resistor pair to charge said respective capacitors with varying magnitudes of voltage in correspondence with the magnitude variation of the outgoing voice-frequency voltage applied to the respective one and other transistor bases for varying the frequency of said preselected carrier frequency in correspondence with the varying frequency of the outgoing voice-frequency voltage.

16. The telephone system according to claim 15 in which said three-terminal variable impedance means comprises a third transistor including a base, a collector of an emitter and connected as an emitter follower, said last-mentioned base constituting said first terminal of said three-terminal means coupled to said hybrid coil means secondary windings, said last-mentioned collector constituting said second terminal of said three-terminal means connected to said first modulating means preselected contact, and said last-mentioned emitter constituting said third terminal of said three terminal means connected to said resistor pair common point.

17. The telephone system according to claim 16 which includes transistor amplifying means for coupling said third transistor base to said hybrid coil means secondary winding; said last-mentioned amplifying means comprising a fourth transistor having a base, a collector and an emitter, said fourth transistor collector connected to said third transistor base, second resistance means connecting said fourth transistor collector to said modulating means preselected contact, said fourth transistor base connected to said one end of said last-mentioned hybrid secondary winding, a voltage divider connected between said last-mentioned contact and ground potential and having a point of predetermined voltage magnitude connected to said fourth transistor base for applying a predetermined bias thereto, and tempearture-responsive means connecting said fourth transistor emitter to ground potential, said last-mentioned means comprising an impedance network and a termistor, said last-mentioned network including a third resistor connected in series with said termistor between said last-mentioned emitter and ground potential, and a fourth resistor connected in parallel with said termistor, said last-mentioned means compensating for ambient temperature and temperature effects inherent in said multivibrator modulator one and other transistors.

18. The telephone system according to claim 17 which includes cathode follower means for coupling an output of said multivibrator modulating means to an input of said carrier-frequency selective means, said last-mentioned coupling means comprising a fifth transistor having a base a collector and an emitter, said last-mentioned base coupled to said modulating means other transistor collector, a fifth resistor also connecting said last-mentioned base to said modulating means preselected contact, said fifth transistor collector also connected to said last-mentioned contact, and a sixth resistor connecting said last-mentioned emitter to ground potential, and a point common to said last-mentioned emitter and resistor coupled to said input of said last-mentioned selective means, whereby said fifth transistor is connected as an emitter follower to provide impedance transformation between said last-mentioned selective means and other transistor collector.

19. The telephone system according to claim 18 which includes monostable multivibrator demodulating means located at said central office terminal and including two three-element electron devices, each having an on-state and an off-state; said electron devices interconnected in a circuit including capacitive means coupling a first element of one device to a first element of the other, third resistive means connecting a point common to said last-mentioned capacitive means and other electron device one element to ground potential, fourth resistive means connecting said one electron device one element and a second element of said other electron device to ground potential, and third elements of said one and other electron devices connected to a terminal having a potential different from ground potential; a second terminal of said one electron device carrier-frequency coupled to said line and said other electron device second element voice-frequency coupled to said central office signaling means; said circuit having such preselected parameters that said one electron device is initially biased at said second element thereof to an off-state and said other electron device at said first element thereof to an on-state and said one electron device is actuated at said element thereof to an on-state in response to each positive cycle of said unmodulated carrier voltage for a time interval predetermined by a preselected time constant of said last-mentioned capacitive means and third resistive means after which time interval said one electron device is returned to the off-state and said other electron device to the on-state, whereby said demodulating means produces output voltage pulses fixed in number in a given time interval in response to said unmodulated carrier voltage and other output voltage pulses varying in number relative to said fixed number in said given time interval in response to said varying frequency carrier voltage;

and low-pass filter means coupled to said other of the electron device second element for utilizing said varying number other output voltage pulses to derive a voice-frequency voltage representing the outgoing voice-frequency voltage at said central office signaling means.

20. The telephone system according to claim 19 in which said monostable multivibrator demodulating means comprises:

sixth and seventh transistors constituting said one and other electron devices, respectively; each latter transistor having a base, a collector, and an emitter; said sixth transistor base constituting said one electron device second element carrier-frequency coupled to said line; a third capacitor constituting said capacitive means and connecting said sixth transistor collector constituting said one electron device first element to said seventh transistor base constituting said other electron device first element; a seventh resistor constituting said third resistance means and having one end connected to a point common to said third capacitor and second transistor base and an opposite end connected to ground potential; said third capacitor and seventh resistor having said predetermined time constant; said fourth resistance means connecting said sixth and seventh transistor collectors constituting said one electron device first element and other electron device, second element, respectively, to ground potential; and means for connecting said sixth and seventh transistor emitters to a voltage terminal having a polarity different from said last-mentioned predetermined polarity;

a feedback circuit including an eighth resistor connecting said seventh transistor collector to said sixth transistor base;

a third unidirectional device connecting said seventh transistor emitter to a voltage terminal different from said last-mentioned predetermined polarity terminal;

a ninth resistor connecting said sixth transistor emitter to said different polarity terminal; said third unidirectional device and a ninth resistor constituting said last-mentioned emitter connecting means; whereby said last-mentioned circuit has such parameters that said sixth transistor is initially biased to the off-state and said seventh transistor to the on-state and said sixth transistor is actuated to the on-state in response to each positive cycle of each of said unmodulated and frequency varying carrier voltages and said seventh transistor is activated to the off-state for said predetermined time interval after which said sixth transistor is returned to the on-state for enabling said demodulating means to produce said fixed number of first-mentioned output voltage pulses and varying number of other output voltage pulses in said given time interval;

and means for coupling seventh transistor collector to said low-pass filter means.

21. The telephone system according to claim 20 in which said last-mentioned coupling means comprises an eighth transistor having a base, a collector and an emitter, said last-mentioned base and collector connected to ground potential; reactive means coupling said eighth transistor base to said seventh transistor collector; a ninth resistor connecting said eighth transistor emitter to said last-mentioned different voltage terminal; and means coupling a point common to said eighth transistor emitter and ninth resistor to an input of said low-pass filter means, whereby said eighth transistor is connected as an emitter follower to provide impedance transformation from said seventh transistor collector to said last-mentioned filter means input.

22. The telephone system according to claim 20 which includes a three stage amplifier for carrier-frequency coupling said sixth transistor base to said line, comprising:

eighth, ninth and tenth transistors, each having a base, a collector and an emitter; said eighth transistor base reactively coupled to said line; said tenth transistor collector reactively coupled to said sixth transistor base;

further reactive means coupling said eighth transistor collector to said ninth transistor base;

fifth resistive means connecting said eighth, ninth and tenth transistor collectors to ground potential;

sixth resistive means connecting said eighth, ninth and tenth transistor emitters to a negative polarity voltage terminal;

an unbypassed resistor included in said last-mentioned resistive means and serially connected between said tenth transistor emitter and said last-mentioned terminal for providing local feedback thereat;

a reactive negative feedback circuit connecting said ninth transistor collector and eighth transistor emitter;

a filter network connecting said ninth transistor collector to said tenth transistor base for attenuating locally generated carrier voltage having the frequency of said preselected carrier voltage frequency;

and voltage divider means connected between ground and said different voltage terminal and including a plurality of preselected points supplying predetermined biasing voltages to said eighth, ninth and tenth transistor bases, respectively; said biasing voltage supplied to said tenth transistor base having such magnitude as to cut-off said tenth transistor stage when the positive peaks of the carrier voltage incoming of said eighth transistor base exceeds a predetermined magnitude, whereby said tenth transistor stage is caused to function as a voltage limiter.

23. The telephone system according to claim 22 which includes carrier-frequency filter means for deriving carrier frequency voltage from said tenth transistor collector, comprising:

amplifier-rectifier means including an eleventh transistor having a base, a collector and an emitter; said last-mentioned base carrier-frequency coupled to said tenth transistor collector;

a second relay operating winding connected between said eleventh collector and a predetermined polarity voltage terminal;

a second impedance network connecting said last-mentioned emitter to said different polarity voltage terminal;

a second relay contact connected in a direct current circuit with said central office signaling means;

and further voltage means having opposite terminals connected between said last-mentioned predetermined and different voltage polarity terminals; said last-mentioned further voltage divider means having a point of preselected voltage magnitude connected to said last-mentioned base for normally biasing said eleventh transistor to cut-off; said last-mentioned transistor activated to conduction in response to positive cycles of said unmodulated carrier voltage and pulses thereof for energizing said second relay winding to close said second relay contact in response to said last-mentioned carrier voltage and pulses to indicate said outgoing call imminence and address, respectively, to said central office signaling means.

24. A telephone system comprising a central office terminal; a source of ringing and voice-frequency voltage at said central office terminal; a customer's terminal; a two-wire signaling line connecting said terminals; and means of said central office terminal for providing a carrier frequency channel on said line, including:

an astable multivibrator modulating means to provide a carrier voltage having a preselected frequency and modulated by said ringing and voice-frequency voltages in sequence to vary said carrier voltage frequency in correspondence with the frequency variations of said last-mentioned ringing and voice voltages; said astable means including:

a pair of transistors, each having a base, a collector and an emitter;

a first capacitor connecting the collector of one of said transistors to the base of the other;

a second capacitor connecting the collector of said other transistor to the base of said one transistor;

impedance means having one terminal connected to a first direct current voltage terminal of preselected polarity;

a plurality of unidirectional devices, each connecting one of said transistor emitters to a second terminal of said impedance means and poled in a direction toward said last-mentioned terminal;

a pair of resistors having corresponding terminals connected to a common point, one of said resistors having another terminal connected to a point common to said first capacitor and other transistor base and the second of said resistors having another terminal connected to a point common to said second capacitor and one transistor base;

resistance means connecting said collectors to a second direct current voltage terminal of a polarity different from said first-mentioned polarity;

a third transistor having a base coupled to said ringing and voice voltage source, an emitter connected to said resistor pair common point, and a collector connected to said different polarity voltage terminal;

and means for coupling said other transistor collector to said line to transmit said frequency varying carrier voltage thereto;

frequency-selective means at said customer's terminal for utilizing said frequency varying carrier voltage derived from said line to produce ringing and voice-frequency voltages corresponding to said source ringing and voice-frequency voltages, respectively, at said central office terminal;

and customer's telephone set means of said customer's terminal for utilizing said corresponding ringing and voice-frequency voltages; whereby said carrier-frequency channel is provided on said line.

25. The telephone system according to claim 24 in which said frequency-selective means includes monostable multivibrator demodulating means for demodulating said derived frequency varying voltage to produce said corresponding ringing and voice-frequency voltages; and in which said telephone set means comprises:

a customer's telephone set including a ringer;

reactive bridge network means for selecting said corresponding ringing voltage from an output of said demodulating means;

means for rectifying said selected corresponding ringing voltage to provide a direct current voltage, including:

a fourth transistor having a base coupled to an output of said network means, an emitter connected to ground and a collector connected to a third direct current voltage terminal having a polarity different from ground;

and a voltage divider connected between ground and said last-mentioned different terminal and having a point of preselected direct current voltage magnitude connected to said fourth transistor base for biasing said fourth transistor below cut-off to cause the operation thereof as rectifier;

a relay operating winding connected in series between said fourth transistor collector and third different voltage terminal;

a first relay transfer contact having one end permanently connected to a first fixed terminal and an opposite end movable to engage a second fixed terminal and a third fixed terminal, one at a time;

a second relay transfer contact having one end permanently connected to a fourth fixed terminal and an opposite end movable to engage a fifth fixed terminal and a sixth fixed terminal, one at a time; said first and second transfer contacts normally disposed betwen said second and third and fifth and sixth terminals, respectively; said last-mentioned first and fourth terminals connected across said ringer;

a supply of direct current voltage having a terminal of positive polarity connected to said transfer contact third and fifth terminals and a terminal of negative polarity connected to said transfer contact second and sixth terminals;

and a plurality of unidirectional devices of which a third device bridges said transfer contact first and second terminals, a foutrh device bridges said transfer contact first and second terminals, said third and fourth devices poled in directions toward and away from said transfer contact first terminal, respectively; a fifth device bridges said transfer contact fourth and fifth terminals and a sixth device bridges said transfer contact fourth and sixth terminals, said fifth and sixth devices poled in directions away from and toward said transfer contact fourth terminal, respectively;

said relay winding alternately energized and de-energized by the rectified output of said rectifying means to actuate said first and second transfer contacts between said transfer contact second and third terminals and fifth and sixth terminals, respectively, for alternately applying said supply positive and negative voltages in predetermined peak-to-peak magnitudes across said ringer to cause the actuation thereof;

and means for applying said corresponding voice-frequency voltage from said output of said demodulating means to a voice-frequency input of said telephone set.

26. The telephone system according to claim 25 in which said monostable multivibrator demodulating means comprises:

fifth and sixth transistors, each having a base, a collector and an emitter;

a capacitor connecting said fifth transistor collector to said sixth transistor base;

a resistor having one end joined to a direct current voltage terminal of preselected polarity and an opposite end to a point common to said last-mentioned capacitor and sixth transistor base;

resistance means connecting said fifth and sixth transistor collectors to said last-mentioned preselected voltage terminal;

a resistive feedback connection extending from said sixth transistor collector to said fifth transistor base;

impedance means connecting said fifth transistor collector to said last-mentioned different voltage terminal;

a unidirectional device connecting said sixth transistor emitter to said last-mentioned different terminal and poled in a direction away from said last-mentioned emitter; said fifth transistor base coupled to said line; said demodulating means producing output voltage pulses varying in number in response to positive pulses of the varying frequency of the carrier voltage relative to a fixed number of output voltage pulses produced in response to positive cycles of the unmodulated preselected carrier voltage frequency as produced in a given time interval;

and low-pass filter means coupling said sixth transistor collector to said bridge network and voltage applying means; said last-mentioned filter means averaging the varying number of output pulses in said given time interval to produce said corresponding ringing and voice-freqeuncy voltages.

27. The telephone system according to claim 24 in which said frequency-selective means includes means for amplifying the frequency-varying carrier voltage derived from said line, comprising:

a three-stage amplifier, each including a transistor having a base, a collector and an emitter; said first stage base coupled to said line; said third stage collector coupled to said customer's telephone set means;

second resistive means connecting said collectors of said three stages to a fourth direct current voltage terminal having a preselected polarity;

third resistive means connecting said emitters of said three stages to a fifth direct current voltage terminal having a polarity different from said last-mentioned preselected polarity; said last-mentioned means including an unbypassed resistor for providing local negative feedback at said third stage;

a resistive negative feedback connection from said second stage collector to said first stage emitter;

a third capacitor coupling said first stage collector to said second stage base;

a filter network coupling said second stage collector to said third stage base for attenuating extraneous voltages having said preselected carrier frequency;

and voltage divider means connected between said last-mentioned preselected and different polarity voltage terminals and having points of predetermined voltage magnitudes for biasing said bases of said first, second and third stages, respectively; said biasing voltage applied to said third stage base having such magnitude as to cut-off said third stage when the peaks of the carrier voltage applied to said first stage base exceed a predetermined magnitude for operating said third stage as a voltage limiter.

28. The telephone system according to claim 24 in which said frequency-selective means includes:

monostable multivibrator demodulating means having an input coupled to said line and producing output voltage pulses fixed in number in response to positive pulses of unmodulated carrier voltage in a given time interval and varying in number in response to positive cycles of the varying frequency carrier voltage frequency in said given time interval;

and low-pass filter means having an input coupled to an output of said demodulating means for averaging the varying number of output pulses in said given time interval to produce said corresponding ringing and voice-frequency voltages;

and in which said customer's telephone set means includes a telephone set having a ringer, and a multistage amplifying means for amplifying said corresponding ringing voltage; said amplifying means comprising:

a fourth transistor having a base coupled to an output of said low-pass filter means, a collector connected to a direct current voltage terminal of preselected polarity and an emitter connected to another direct current voltage terminal of a polarity different from said last-mentioned preselected polarity;

first voltage divider means connected between said last-mentioned preselected and different voltage terminals and having a point of predetermined biasing voltage magnitude connected to said fourth transistor base;

a phase inverter including a fifth transistor having a base coupled to said fourth transistor collector;

sixth and seventh transistors, said sixth transistor having a base coupled to said inverter transistor collector and said seventh transistor having a base coupled to said inverter transistor emitter; said collectors of said inverter, sixth and seventh transistors connected to a direct current voltage terminal of preselected polarity;

eighth and ninth transistors connected in push-pull, each of said latter transistors having a base, a collector and an emitter; said eighth transistor base connected to an emitter of said sixth transistor whereby said last-mentioned transistor is connected as an emitter follower; said ninth transistor base connected to an emitter of said seventh transistor whereby said last-mentioned transistor is connected an emitter follower; said eighth and ninth transistor emitters connected to a direct current voltage terminal of a polarity different from said last-mentioned preselected polarity;

second voltage divider means connected between said last-mentioned preselected and different voltage terminals and having points of predetermined biasing voltage magnitude connected to said sixth and seventh transistor bases, respectively;

third voltage divider means connected between said last-mentioned preselected and different voltage terminals and having points of predetermined biasing voltage magnitude connected to said eighth and ninth transistor bases;

and a transformer having a primary winding whose corresponding opposite terminals are connected to said eighth and ninth transistor collectors, respectively, and a midpoint to said last-mentioned preselected voltage terminal; said transformer having a secondary winding connected across said ringer whereby amplified corresponding ringing voltage is applied thereto to cause the actuation thereof.

29. A carrier signal transmitter, comprising in combination:

a source of an alternating current signal varying in frequency and magnitude;

a load;
astable multivibrator modulating means, including:
a pair of transistors, each including a base, a collector and an emitter;
a first capacitor connecting said collector of one of said transistors to said base of the other;
a second capacitor connecting said collector of said other transistor to said one transistor base;
first impedance means connecting said collectors of said one and other transistors to a direct current voltage terminal of preselected polarity;
second impedance means connecting said emitters of said one and other transistors to a direct current voltage terminal of a polarity different from said preselected polarity;
a pair of resistors of which a first resistor has one end joined to a point common to said first capacitor and other transistor base and a second resistor has one end joined to a point common to said second capacitor and one transistor base; said first and second resistors having opposite ends connected to a common point; whereby said modulating means is energized by a direct current voltage of predetermined magnitude applied to said first and second resistor common point to produce a carrier signal having a preselected frequency;
impedance means for coupling said other transistor base to said load;
and variable impedance coupling said one transistor base to said signal source, comprising:
a third transistor having a collector connected to said preselected voltage terminal, an emitter connected to said first and second resistor common point, and a base;
a fourth transistor having a base coupled to said signal source, an emitter connected to said different voltage terminal, and a collector;
a third resistor connecting said preselected voltage terminal to said fourth transistor collector and third transistor base;
a fifth resistor connecting said preselected voltage terminal to said fourth transistor base; said source supplying signal voltage of varying magnitude to activate said fourth transistor for causing said third transistor to apply voltage of varying magnitude to said first and second resistor common point to varyingly activate said modulating means to vary the frequency of said carrier signal relative to said preselected frequency in correspondence with the varying magnitude of said signals;
and means for transmitting said modulated carrier signal.

30. The transmitter according to claim 29 which includes temperature-responsive means connecting said fourth transistor emitter to said different voltage terminal, comprising:
an impedance network and a thermistor; said last-mentioned network including at least a fifth resistor connected in series with said thermistor and a sixth resistor connected in parallel therewith; said last-mentioned means compensating for ambient temperature changes and temperature effects inherent in said one and other transistors.

31. A carrier signal receiver comprising, in combination:
a source of a carrier signal modulated in frequency relative to a preselected frequency by a modulating alternating current signal of varying frequency;
a monostable multivibrator transistor demodulating said modulated carrier signal, including:
a pair of transistors, each having a base, a collector and an emitter;

a capacitor connecting the collector of one transistor to the base of the other;
first resistive means connecting a point common to said capacitor and other transistor base to a direct current voltage terminal of preselected polarity;
second resistive means connecting said collectors of said one and other transistors to said preselected terminal;
third resistive means connecting said one transistor emitter to a direct current voltage terminal having a polarity different from said preselected terminal;
unidirectional means connecting said other transistor emitter to said different terminal;
and feedback means connecting said other transistor collector to said one transistor base; said demodulating means energized to produce a fixed number of output pulses in a given time interval in response to positive cycles of said carrier signal in unmodulated form and activated by positive cycles of said modulated carrier signal to produce output pulses varying in number relative to said fixed number in said given time interval;
low-pass filter means for translating said varying number of output pulses in said given time interval into an alternating current signal of varying frequency corresponding with said modulating signal of varying frequency;
and means for utilizing said corresponding signal.

32. A telephone subscriber transmitting signalling circuit comprising a subscriber telephone set, multivibrator modulating means having power supply, signal input, and signal output terminal means, means providing a direct current voltage source having a terminal at which a voltage of preselected polarity is applied, means operated by placement of said telephone set in an off-hook condition (a) for electrically connecting said voltage source terminal to said power supply terminal means to activate said modulating means to produce a carrier voltage of predetermined voltage at said output terminal means and (b) for applying voice signal voltages developed at said telephone set to said input terminal means to vary the frequency of said carrier voltage relative to said predetermined voltage, and means electrically connected to said output terminal means for transmitting the frequency varied carrier voltage, said multivibrator modulating means comprising a pair of transistors each having collector and emitter terminals and a base, means comprising a first capacitor connecting one of said terminals of one of said transistors to the base of the other of said terminals, means comprising a second capacitor connecting one of said terminals of said other transistor to the base of said one transistor, circuit means coupling the bases of said one and other transistors to said signal input terminal means, first impedance means connecting said one terminal of said one transistor to said power supply terminal means, second impedance means connecting said one terminal of said other transistor to said power supply terminal means, third impedance means connecting the other of said terminals of each of said transistors to a source of reference voltage, and means electrically connecting said one terminal of said other transistor to said signal outut terminal means.

33. The telephone subscriber transmitting signalling circuit defined in claim 32 wherein said one terminal of each of said transistors is said collector terminal, and wherein said other terminal of each of said transistors is said emitter terminal.

34. A telephone subscriber receiving signalling circuit comprising a source of carrier voltage modulated in frequency relative to a predetermined frequency in accordance with a varying frequency modulating voltage, transistor multivibrator demodulating means including: two transistors, each having a base, a collector and an emitter; said base of one of said transistors coupled to said carrier voltage source; a capacitor connecting said collector of said one transistor to said base of the other; first impedance means connecting said one and other transistor collectors to a source of reference voltage; second impedance means having one terminal connected to a point common to said capacitor and other transistor base and said reference voltage source; positive feedback means interconnecting said other transistor collector and said one transistor base; circuit means connecting a direct voltage terminal having a preselected polarity to said one and other transistor emitters; whereby said one transistor is normally biased to turn-off and said other transistor to turn-on and thereafter said one and other transistors are successively activated to turn-on and turn-off for activating said demodulating means to provide in said other transistor collector output circuit output voltage pulses fixed in number in a given time interval in response to positive cycles of said carrier voltage in unmodulated form and other output voltage pulses varying in number relative to said fixed number in said given time interval in response to positive cycles of said frequency modulated carrier voltage, said last-mentioned varying frequency other output voltage pulses representing said varying frequency modulating voltage; and load means coupled to said other transistor collector output circuit for utilizing said last-mentioned varying frequency other output voltage pulses.

References Cited

UNITED STATES PATENTS

| | | | |
|---|---|---|---|
| 2,438,950 | 4/1948 | Smith | 179—15 |
| 2,525,634 | 10/1950 | Atwood et al. | 179—15 |
| 3,143,658 | 8/1964 | Woods et al. | 332—14 |
| 1,513,761 | 11/1924 | Osborne | 179—15 |
| 2,151,173 | 3/1939 | Whittle | 179—15 |
| 2,184,826 | 12/1939 | Wiessner | 179—2.5 |
| 2,202,474 | 5/1940 | Vroom | 179—2.5 |
| 2,440,239 | 4/1948 | Almquist | 179—15 |
| 2,677,726 | 5/1954 | Entz et al. | 179—15 |
| 2,721,897 | 10/1955 | Schneckloth | 179—2.5 |
| 2,917,580 | 12/1959 | Yem Chen | 179—1 |
| 3,076,871 | 2/1963 | Bauman | 179—2.5 |
| 2,932,694 | 4/1960 | Hawks et al. | 179—15 |
| 2,757,286 | 7/1956 | Wanlass | 307—290 |

OTHER REFERENCES

R. J. P. Jones: "A Wide Frequency Range Voltage Controlled Multivibrator," Electronic Engineering, January 1967, pp. 14–15.

ROBERT L. GRIFFIN, Primary Examiner

C. R. VONHELLENS, Assistant Examiner

U.S. Cl. X.R.

179—2.5; 325—143; 328—193